United States Patent [19]

Fore

[11] Patent Number: 4,864,597
[45] Date of Patent: Sep. 5, 1989

[54] CABLE PAIR TESTER

[76] Inventor: Don C. Fore, 324 N. Brown, Vinita, Okla. 74301

[21] Appl. No.: 156,909

[22] Filed: Feb. 17, 1988

[51] Int. Cl.$^4$ .................. H04M 1/24; H04B 3/46
[52] U.S. Cl. .................. 379/6; 379/27; 379/29; 324/539
[58] Field of Search .......... 379/6, 27, 29, 21, 22; 324/539, 540

[56] References Cited

U.S. PATENT DOCUMENTS 4,639,557  1/1987  Butler et al. .................. 379/29

OTHER PUBLICATIONS

Exhibit A-Pair Identifier Office Unit 4960A, 13 pages, undated.
Exhibit B-Automatic Pair Identifier System, 4 pages, undated.
Microelectronic Products Data Book, Issue 3, '86-'87, p. MSAN-106, This Article Describes Applications for DTMF (Dual Tone Multiple Frequency).
Direct Access Test Unit (DATU), Product Brochure, not dated, Harris of Calif.
Direct Access Test Unit Service Manual, pp. 1-12, dated Nov. 1985.

*Primary Examiner*—Stafford D. Schreyer
*Attorney, Agent, or Firm*—Dunlap, Codding, Peterson & Lee

[57] ABSTRACT

An apparatus adapted for use with a plurality of cable pairs for placing a test condition on a selected cable pair including a cable pair tester and means remote from the cable pair tester for supplying a cable pair command code and a test condition command code. The cable pair tester includes a portion connected to each of the cable pairs with electrical continuity being interrupted between the cable pairs and the cable pair tester. The cable pair tester is adapted to establish electrical continuity between a selected one of the cable pairs and the cable pair tester in response to receiving a cable pair command code uniquely identifying the selected cable pair. The cable pair tester places the test condition on the selected cable pair in response to receiving the test condition command code.

38 Claims, 6 Drawing Sheets

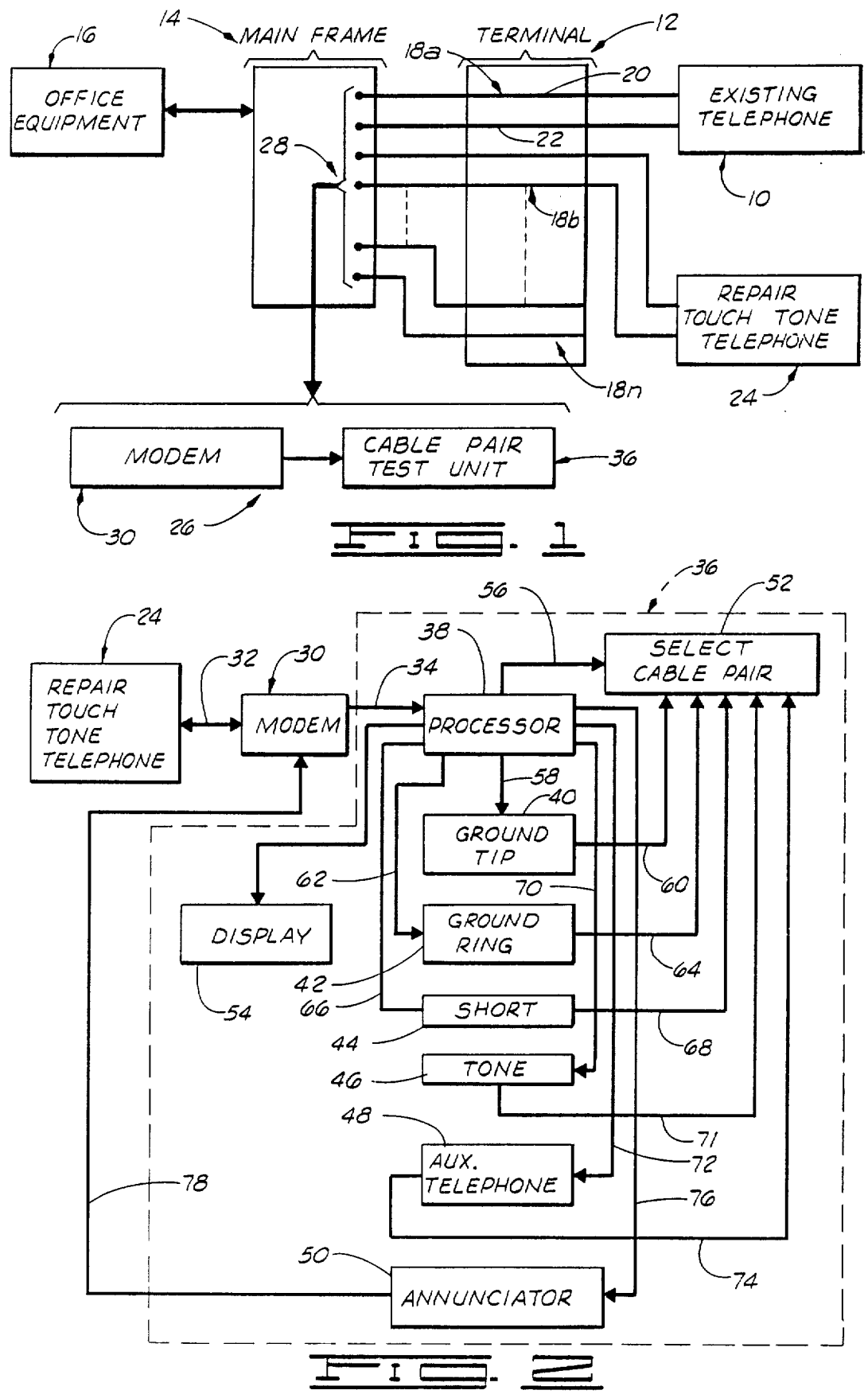

CABLE PAIR TESTER

BACKGROUND OF THE INVENTION

FIELD OF THE INVENTION

The present invention relates generally to a system for conducting certain tests on cable pairs which are connectable to telephones and, more particularly but not by way of limitation, to a cable pair tester for automatically placing predetermined test conditions on selected cable pairs as directed from a remote location.

BRIEF DESCRIPTION OF THE DRAWINGS

FIG. 1 is a diagrammatic view showing an existing telephone system with the cable pair test unit of the present invention connected to a portion thereof.

FIG. 2 is a diagrammatic view of the cable pair test unit of the present invention, together with the modem portion of the cable pair tester and the existing repair touch tone telephone.

DESCRIPTION OF THE PREFERRED EMBODIMENTS

Figure 3:
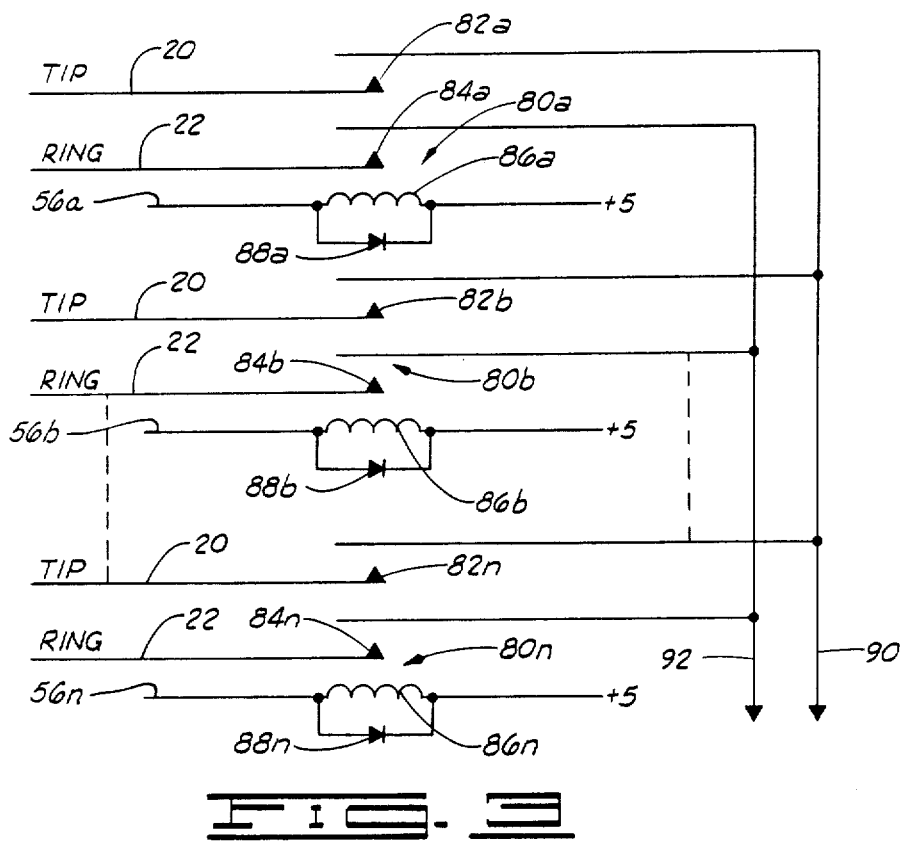
FIG. 3 is a schematic view showing a plurality of cable pairs in a main frame and the select cable pair network portion of the cable pair test unit for connecting selected cable pairs to the cable pair test unit.

Shown in FIG. 1 is an existing telephone 10 which is connected through a terminal 12 to a main frame 14 and to office equipment 16 by a cable pair 18 consisting of a pair of wires 20 and 22. As just described, this is a typical, well known connection of a customer's telephone to the telephone equipment at a telephone company central office. The pair of wires 20 and 22 commonly are referred in the art and will be referred to herein sometimes as "tip" and "ring", respectively.

The terminal 12 typically includes a plurality of cable pairs 18, the cable pairs 18 being specifically designated in FIG. 1 by the reference numerals 18a, 18b and 18n, with only three cable pairs 18 being specifically shown in FIG. 1. The cable pair 18a specifically is connected to the existing telephone 10, as shown in FIG. 1. Each of the cable pairs 18a, 18b and 18n includes the tip and ring 20 and 22, although only the tip and ring 20 and 22 of the cable pair 18a specifically are designated by reference numerals in FIG. 1.

Each of the cable pairs 18 and the terminal 12 is connected to the main frame 14. However, typically only some of the cable pairs 18 in the terminal 10 are connected to existing telephones, such as the existing telephone 10 shown in FIG. 1. Thus, the terminal 12 typically has a plurality of existing cable pairs 18 which are available for future use if connected to an existing telephone.

If a telephone company customer reports a problem with the existing telephone 10, a service person must travel to the existing telephone 10. This service person typically would conduct certain tests on the cable pair 18a to determine if the problem is some fault in this cable pair 18a and or perhaps in an attempt to locate the fault in the cable pair 18a so that it could be repaired. However, the service person more than likely would simply connect the existing telephone more than likely would simply connect the existing telephone 10 to one of the other cable pairs 18 in the terminal 12 once the service person has located an existing cable pair 18 in the terminal 12 which is operable, contains no faults. Thus, the service person conducts various tests on different existing cable pairs 18 in the terminal 12 in order to locate an existing cable pair 18 which is without fault to connect to the existing telephone 10 and place the existing telephone 10 back in service.

In the past, the service person would connect a repair touch tone telephone 24 to an existing cable pair 18 such as the cable pair 18b as diagrammatically illustrated in FIG. 1. This existing cable pair 18b is a cable pair 18 already connected to another existing telephone in service The repair person then would call the central office and request the frame personnel in the central office to place certain tests conditions on a preselected cable pair 18 in the terminal 12. The frame personnel in the central office then would go to the main frame 14 and place the requested test condition on the selected cable pair 18 so the service person could conduct certain test to determine if the selected cable pair 18 was without fault.

Once a cable pair 18 was located in the terminal 12 without fault, the service person then would connect this good cable pair to the customer's existing telephone 10 to place the existing telephone 10 back in service.

The service person typically would request the frame personnel to place several test conditions on the selected cable pair 18. Each requested tested condition would require the service person to call the frame personnel and then would require the frame personnel's time in placing the requested test condition on the selected cable pair 18. The frame personnel also would have to disconnect the test conditions from the selected cable pair 18.

All of this required a substantial amount of time and occupied the time of the frame personnel at the central office to place the requested test conditions on the selected cable pair 18.

The present invention consists of a cable pair tester 26 which is removably connected to a plurality of cable pairs 18 at the main frame 14 by way of a connector 28, which diagrammatically is illustrated in FIG. 1. As shown in FIG. 1, the cable pair tester 26 is connected to all of the cable pairs 18 in the main frame 14. In practice, the cable pair tester 26 may be connected only to some of cable pairs 18 in the main frame 14. Also, it should be noted that, in one contemplated embodiment, the cable pair tester 26 is permanently connected to all of the cable pairs 18 at a particular main frame 14.

The connector 28 comprises one portion which is removably connected to the cable pairs 18 and another portion which consists of a cable for connecting the cable pairs 18 to the cable pair tester 26 as diagrammatically illustrated in FIG. 1 by the arrow between the cable pairs 18 and the cable pair tester 26. Connectors consisting of a removable plug and a cable for connecting the cable pair tester 26 to the cable pairs 18 are commercially available such as the connector and cable sold by Western Electric and designated as 300 Type, for example, AT8265 302 Type 1 for a modular protector frame.

The cable pair tester 26 is connected to all of the cable pairs 18 by way of the connector 28. The cable pair tester 26 includes a portion connected to each of the cable pairs in the connector 28 in such a manner that electrical continuity is interrupted between each of the cable pairs 18 and the cable pair tester 26 in one condition of the cable pair tester 26. The cable pair tester 26 is adapted to establish electrical continuity between a selected one of the cable pairs 18 and the cable pair tester 26 in response to receiving a cable pair command code uniquely identifying the selected cable pair 18. The cable pair tester 26 also is adapted to place the test condition on the selected cable pair 18 in response to receiving a test condition command code.

The present invention also contemplates means remote from the cable pair tester 26 for supplying the cable pair command code and the test condition command code. In the embodiment of the invention illustrated in the drawings, this means comprises the repair touch tone telephone 24, a touch tone telephone of the type typically carried by repair persons. By depressing certain, preselected buttons on the repair touch tone telephone 24, the repair touch tone telephone 24 generates cable pair command codes with each cable pair command code uniquely identifying one of the cable pairs 18 as the selected cable pair 18 and the repair touch tone telephone 24 generates the test condition command code for uniquely identifying the test condition to be placed on the selected cable pair 18.

In one other embodiment, a separate code generating means could be utilized for generating unique codes to be transmitted to the cable pair tester 26 comprising the cable pair command codes and the test condition command codes in some other form other than utilizing an existing touch tone telephone such as the repair touch tone telephone 24. However, the generation of the cable pair command codes and the test condition command codes by use of the keys or buttons on a existing touch tone telephone have been utilized in the embodiment illustrated of the present invention since a telephone repair man already has an existing repair touch tone telephone such as the repair touch tone telephone 24 illustrated in FIG. 1. Thus, it is economically useful to utilize the existing repair touch tone telephone 24 for generating the cable pair command codes and the test condition command codes.

In operation, the repair person connects the cable pair tester 26 to a plurality of cable pairs 18 at the main frame 14, assuming the cable pair tester 26 is not permanently connected to the cable pair 18 in the manner mentioned before. The repair person then travels to the location of the existing telephone 10 which has been identified as having disrupted service.

The telephone repair person connects the repair touch tone telephone 24 to one of the cable pairs 18 at the terminal 12. As illustrated in FIG. 1, the repair touch tone telephone 24 is connected to the specific cable pair 18b for establishing communication between the repair touch tone telephone 24 and the cable pair tester 26 by way of the cable pair 18b and the connector 28. The particular cable pair 18b in this example, is a cable pair 18b which already is dedicated to another existing telephone but which may be utilized by the repair person during the repair operation of the existing telephone 10, as mentioned before.

After the repair touch tone telephone 24 has been connected to the cable pair tester 26 by way of the cable pair 18b and the connector 28, the repair person then depresses selected buttons on the repair touch tone telephone 24 to generate a cable pair tester connection code which comprises the telephone number dedicated to the cable pair tester 26. Once communication has been established between the repair touch tone telephone 24 and the cable pair tester 26, the repair person then depresses selected buttons on the repair touch tone telephone to generate the cable pair command code uniquely identifying one of the cable pairs 18 in the terminal 12. The generated cable pair command code is transmitted over the cable pair 18b and the connector 28 to the cable pair tester 26. The cable pair tester 26 receives the cable pair command code and the cable pair tester 26 establishes electrical continuity between the cable pair 18 uniquely identified by the cable pair command code and the cable pair tester 26.

Once electrical continuity is established between selected cable pair 18 and the cable pair tester 26, the repair person then depresses preselected buttons on the repair touch tone telephone 24 to generate a test condition command code uniquely identifying a particular test condition. This test condition command code then is transmitted over the cable pair 18b connected to the repair touch tone telephone 24 through the connector 28 to the cable pair tester 26. The cable pair tester 26 receives the transmitted test condition command code. The cable pair tester 26 is adapted to place the selected test condition on the selected cable pair 18 in response to receiving the test condition command code uniquely identifying the particular test condition to be placed on the selected cable pair 18.

Once the test condition has been placed on the selected cable pair by way of the cable pair 26, the repair person then can conduct certain tests on the selected cable pair at the terminal 12 to determine if the selected cable pair is without fault. If the cable pair repair person determines a selected cable pairs without fault, the repair person then can connect the selected cable pair 18 to the existing telephone 10, thereby reestablishing service to the existing telephone 10.

It is significant to note that all of the test conditions are placed on the selected cable pair without the intervention of any frame personnel at the main frame 14. Thus, the present invention provides a means for the repair person automatically to place selected test conditions on a selected cable pair 18 without waiting for frame personnel at the main frame 14 to manually place such test conditions on the selected cable pair 18 and without requiring the use of the time of frame personnel at the main frame 14 for placing requested tests conditions on a selected cable pair 18. This is particular significant in those installations where frame personnel are not normally maintained at the main frame 14 because of the small size of the particular telephone office. In these instances, the repair person would have to travel back to the main frame 14 and manually place the test conditions on the selected cable pair and then travel back to the location of the existing telephone 10 for testing the selected cable pair 18 for continuity.

As shown in FIGS. 1 and 2, the cable pair tester 26 also includes a modem 30. The repair touch tone telephone 24 actually is connected to the modem 30 by way of a cable pair 18 and the connector 28 as diagrammatically illustrated in FIG. 2 by the signal path 32. The modem 30 is adapted to receive the cable pair tester connection code and to connect the cable pair 18 carrying the incoming call to a cable pair test unit 36 portion of the cable pair tester 26 in response to receiving the cable pair tester connection code uniquely associated with the cable pair tester 26 or, in other words, in response to receiving a cable pair tester connection code comprising the telephone number dedicated to the particular cable pair tester 26. Once the modem 30 is connected to the repair touch tone telephone 24 in response to receiving a cable pair tester connection code uniquely identifying the particular cable pair tester 26, the modem 30 then is adapted to receive cable pair command codes and test conditions command codes and to pass such codes to the cable pair test unit 36 by way of a signal path 34.

The cable pair tester 26 comprises the modem 30 and the cable pair test unit 36. The cable pair test unit 36 comprises a processor 38, a ground tip network 40 designated in FIG. 2 as "ground tip", a ground ring network 42 designated in FIG. 2 as "ground ring", a short network 44 designated in FIG. 2 as "short", a tone network 46 designated in FIG. 2 as "tone", and an auxiliary telephone network 48 designated in FIG. 2 as "aux. telephone", an annunicator network 50 designated in FIG. 2 as "annunicator", a select cable pair network 52 designated in FIG. 2 as "select cable pair", and a display 54.

The processor 38 is adapted to receive cable pair command codes over the signal path 34 and the processor 38 is adapted to provide a signal over a signal path 56 in response to receiving a particular cable pair command code for activating the select cable pair network 52 to establish electrical continuity between the cable pair tester 26 and the selected cable pair 18 uniquely identified by the particular received cable pair command code. Once electrical continuity is established between the cable pair test unit 36 and the selected cable pair 18 by the select cable pair network 52, the processor 38 then is adapted to receive test condition command codes over the signal path 34.

In response to receiving a test condition command code indicating that a ground condition should be placed on the tip 20 of the selected cable pair 18, the processor 38 outputs a signal on a signal path 58 which is received by the ground tip network 40. In response to receiving the signal from the processor 38, the ground tip network 40 places a ground condition on the tip 20 of the selected cable pair 18, as indicated diagrammatically in FIG. 2 by the output signal path 60 from the ground tip network 40. The ground tip network 40 in cooperation with the processor 38 is adapted to place the ground condition on the tip 20 for a predetermined period of time. After this predetermined period of time, the processor 38 outputs a signal on the signal path 58 for causing the ground tip network 40 to disconnect the ground condition from the tip 20 of the selected cable pair 18.

In response to receiving a test condition command code indicating that a ground condition should be placed on the ring 22 of the selected cable pair 18, the processor 38 outputs a signal on a signal path 62 which is received by the ground ring network 42. In response to receiving the signal from the processor 38, the ground ring network 42 places a ground condition on the ring 22 of the selected cable pair 18, as indicated diagrammatically in FIG. 2 by the output signal path 64 from the ground ring network 42. The ground ring network 42 in cooperation with the processor 38 is adapted to place the ground condition on the ring 22 for a predetermined period of time. After this predetermined period of time, the processor 38 outputs a signal on the signal path 62 for causing the ground ring network 42 to disconnect the ground condition from the ring 22 of the selected cable pair 18.

In response to receiving a test condition command code indicating that a short condition should be placed on the tip and ring 20 and 22 of the selected cable pair 18, the processor 38 outputs a signal on a signal path 66 which is received by the short network 44. In response to receiving the signal from the processor 38, the short network 44 places a short condition on the tip and ring 20 and 22 of the selected cable pair 18 as indicated diagrammatically in FIG. 2 by the output signal path 68 from the short network 44. The short network 44 in cooperation with the processor 38 is adapted to place the short condition on the selected cable pair 18 for a predetermined period of time. After this predetermined period of time, the processor 38 outputs a signal on the signal path 66 for causing the short network 44 to disconnect the short condition from the selected cable pair 18.

In response to receiving a test condition command code indicating that a tone should be placed on the selected cable pair 18, the processor 38 outputs a signal on a signal path 70 which is received by the tone network 46. In response to receiving the signal from the processor 38, the tone network 46 places a tone signal on the selected cable pair 18, as diagrammatically indicated by the output signal path 71 in FIG. 2. The tone network 46 in cooperation with the processor 38 is adapted to place the tone condition on the selected cable pair 18 for a predetermined period of time. After this predetermined period of time, the processor 38 outputs a signal on the signal path 70 for causing the tone network 46 to disconnect the tone signal from the selected cable pair 18.

The tip ground, ring ground and short represent typical test conditions which a repair person would request be placed on a selected cable pair 18 for testing for continuity in the selected cable pair 18. In some instances, it will be necessary for the repair person to identify the selected cable pair 18 at the terminal 12 and, in these instances, the repair person would request the time test conditions to assist the repair person in locating the selected cable pair 18.

The process 38, in the embodiment in the invention illustrated in FIG. 2 also is adapted to output a signal over a signal path 72 for reception by the auxiliary telephone network 48 in response to receiving a command signal generated by the repair person utilizing the repair touch tone telephone 24. In response to receiving the signal over the signal path 72, the auxiliary telephone network 48 operates to connect the existing telephone number to the selected cable pair 18 by way of the select cable pair network 52, as illustrated in FIG. 2 by way of the signal path 74. In this manner, the repair person can restore full service to the existing telephone 10 from a remote location using the cable pair tester 26.

The embodiment of the invention illustrated in FIG. 2 also includes the annunicator network 50. The processor 38 is adapted to output a signal over a signal path 76 which is received by the annunicator network 50 and the annunicator network 50 is adapted to output a prerecorded message or a tone over a signal path 78 which is connected to the repair touch tone telephone 24 by way of the modem 30 and the signal path 32. In some instances, it may be desirable to output a prerecorded message providing the repair person with instructions on how to generate the cable pair command codes and test conditions command codes so the repair person will receive instructions as to the operations to be performed by the repair person for selecting a particular cable pair and for placing a predetermined test conditions on the selected cable pair 18. In other instances, it may be desirable simply to generate a tone to be transmitted back to the repair touch tone telephone 24 to provide an audible indication to the repair person that the repair touch tone telephone 24 in fact is connected to the cable pair tester 26.

Shown in FIG. 3 is a schematic view of the select cable pair network 52. The plurality of cable pairs 18a, 18b and 18n are indicated in FIG. 3, and a normally opened relay 80 is interposed in each of the cable pairs 18a, 18b and 18n, the relays 80 being specifically designated in FIG. 3 as 80a, 80b and 80n. Each relay 80 comprises a pair of normally open contacts 82 and 84. The contacts associated with relay 80a are designated in FIG. 3 by the specific reference numerals 82a and 84a, the contacts associated with the relay 80b are designated in FIG. 3 by the specific reference numerals 82b and 84b and the contacts associated with the relay 80n are designated in FIG. 3 by the specific reference numerals 82n and 84n.

Each set of contacts 82 and 84 is associated with a coil 86, the coil 86 comprising a portion of the relay 80. The coil associated with the relay 80a is designated in FIG. 3 by the specific reference numeral 86a, the coil associated with the relay 80b is designated in FIG. 3 by the specific reference numeral 86b, and the coil associated with the specific relay 80n is designated in FIG. 3 by the specific reference numeral 86n. A diode 88 is connected in parallel to each of the coils 86 to provide spike protection.

Each of the cable pairs 18 is connected to a pair of conductors 90 and 92 comprising a function bus. More particularly, the tip 20 of each of the cable pairs 18 is connected to the conductor 90 and the ring 22 of each of the cable pairs 18 is connected to the conductor 92.

When the cable pair test unit 36 receives a cable pair command code uniquely identifying one of the cable pairs 18, the processor 38 outputs a signal energizing the coil 86 associated with the selected cable pair 18 thereby energizing the coil 86 and closing the contacts 82 and 84 to establish electrical continuity between the selected cable pair 18 and the function bus comprising the conductors 90 and 92. For example, if the cable pair command code uniquely identify the particular cable pair 80b, the processor 38 would output a signal on the signal path 56b for energizing the coil 86b thereby closing the contacts 82b and 84b and establishing electrical continuity between the cable pair 18b and the function bus comprising the conductors 90 and 92.

Figure 4:
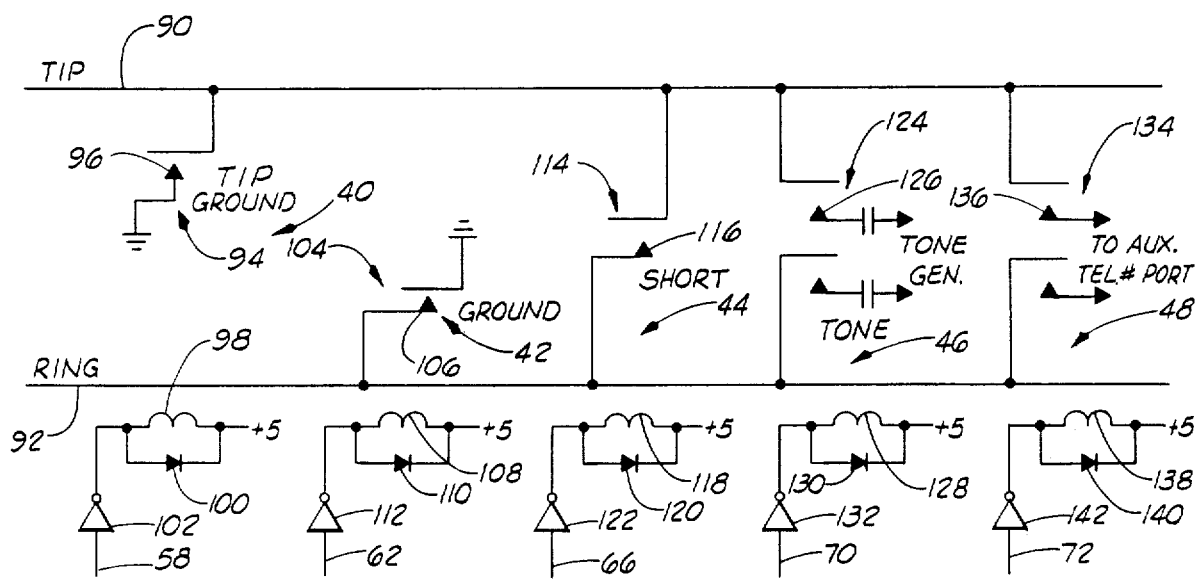
FIG. 4 is a schematic view of the ground tip network, ground ring network, short network, tone network and auxiliary telephone network portion of the cable pair test unit.

The ground tip network 40 is schematically shown in FIG. 4. The ground tip network 40 includes a relay 94 comprising contacts 96 and an associated coil 98. A diode 100 is connected in parallel with the coil 98 for spike protection and the coil 98 is driven through a driver 102.

The coil 98 is normally deenergized and the contacts 96 normally are opened. The contacts 96 are connected to ground and to the conductor 90 which is connected to the tip 20 of the cable pairs 18 by way of the relays 80.

When the processor 38 receives a test condition command code uniquely identifying that a ground condition is to be placed on the tip 20 of the selected cable pair 18, the processor 38 provides the signal on the signal path 58 for energizing the coil 98 thereby closing the contacts 96 and connecting the conductor 90 to ground. Assuming the selected cable pair is the particular cable pair 18b, the relay 80b previously would have been operated to close the contacts 82b and 84b. Since the conductor 90 has been connected to ground by the closing of the contacts 96 and since the conductor 90 is connected to the tip 20 of the cable pair 18b, the tip 20 of the cable pair 18b automatically now is connected to ground through the contacts 96 of the relay 94. Thus, the closing of the contacts 96 automatically places a ground condition on the tip 20 of the selected cable pair 18b. The processor 38 is adapted to provide the signal on the signal path 58 for energizing the coil 98 for a predetermined period of time and, after this period of time, the coil 98 is deenergized and the contacts 96 again are opened.

The ground ring network 42 is schematically shown in FIG. 2. The ground ring network 42 includes a relay 104 comprising contacts 106 and an associated coil 108. A diode 110 is connected in parallel with the coil 98 for spike protection and the coil 108 is driven through a driver 112.

The coil 108 is normally deenergized and the contacts 106 normally are opened. The contacts 106 are connected to ground and to the conductor 92 which is connected to the ring 22 of the cable pairs 18 by way of the relays 80.

When the processor 38 receives a test condition command code uniquely identifying that a ground condition is to be placed on the ring 22 of the selected cable pair 18, the processor 38 provides the signal on the signal path 62 for energizing the coil 108 thereby closing the contacts 106 and connecting the conductor 92 to ground. Assuming the selected cable pair is the particular cable pair 18b, the relay 80b previously would have been operated to close the contacts 82b and 84b. Since the conductor 92 has been connected to ground by the closing of the contacts 106 and since the conductor 92 is connected to the ring 22 of the cable pair 18b, the ring 22 of the cable pair 18b automatically now is connected to ground through the contacts 106 of the relay 104. Thus, the closing of the contacts 106 automatically places a ground condition on the ring 22 of the selected cable pair 18b. The processor 38 is adapted to provide the signal on the signal path 62 for energizing the coil 108 for a predetermined period of time and, after this period of time, the coil 108 is deenergized and the contacts 106 again are opened.

The short network 44 is schematically shown in FIG. 4. The short network 44 includes a relay 114 comprising contacts 116 and an associated coil 118. A diode 120 is connected in parallel with the coil 118 for spike protection and the coil 118 is driven through a driver 122.

The coil 118 is normally deenergized and the contacts 116 normally are opened. The contacts 116 are connected to ground and to the conductors 90 and 92 which are connected to the tips 20 of the cable pairs 18 by way of the relays 80.

When the processor 38 receives a test condition command code uniquely identifying that a short condition is to be placed on the selected cable pair 18, the processor 38 provides the signal on the signal path 66 for energizing the coil 118 thereby closing the contacts 116 and connecting the conductors 90 and 92 by way of the contacts 116. Assuming the selected cable pair is the particular cable pair 18b, the relay 80b previously would have been operated to close the contacts 82b and 84b. Since the conductors 90 and 92 have been connected by the closing of the contacts 116 and since the conductors 90 and 92 are connected to the tip and ring 20 and 22 of the selected cable pair 18b, the tip and ring 20 and 22 of the selected cable pair 18b automatically now is connected through the contacts 116 of the relay 114. Thus, the closing of the contacts 116 automatically places a short condition across the selected cable pair 18b. A processor 38 is adapted to provide the signal on the signal path 66 for energizing the coil 118 for a predetermined period of time and, after this period of time, the coil 118 is deenergized and the contacts 116 again are opened.

The tone network 46 is schematically shown in FIG. 4. The tone network 46 includes a relay 124 comprising contacts 126 and an associated coil 128. The contacts are connected to a tone generator as indicated in FIG. 4 with the tone generator being adapted to output a tone signal. A tone generator is shown in detail in FIG. 9 and the output of this tone generator is connected to the contacts 126. The contacts 126 also are connectable to the tip and ring 20 and 22. A diode 130 is connected in parallel with the coil 128 for spike protection and the coil 128 is driven through a driver 132.

The coil 128 is normally deenergized and the contacts 126 normally are opened. The contacts 126 are connected to ground and to the conductors 90 and 92 which are connected to the tip and ring 20 and 22 of the cable pairs 18 by way of the relays 80.

When the processor 38 receives a test condition command code uniquely identifying that a tone condition is to be placed on the tip 20 of the selected cable pair 18, the processor 38 provides the signal on the signal path 70 for energizing the coil 128 thereby closing the contacts 126 and connecting the conductors 90 and 92 to the tone generator. Assuming the selected cable pair is the particular cable pair 18b, the relay 80b previously would have been operated to close the contacts 82b and 84b. Since the conductors 90 and 92 have been connected to the tone generator by the closing of the contacts 126 and since the conductors 90 and 92 are connected to the tip and ring 20 and 22 of the cable pair 18b, the cable pair 18b automatically now is connected to the tone generator through the contacts 126 of the relay 124, thereby imposing a tone signal on the selected cable pair 18b. Thus, the closing of the contacts 126 automatically places a ground condition on the tip 20 of the selected cable pair 18b. A processor 38 is adapted to provide the signal on the signal path 68 for energizing the coil 128 for a predetermined period of time and, after this period of time, the coil 128 is deenergized and the contacts 126 again are opened.

The auxiliary telephone network 48 is schematically shown in FIG. 4. The auxiliary telephone network 48 includes a relay 134 comprising contacts 136 and an associated coil 138. A diode 140 is connected in parallel with the coil 238 for spike protection and the coil 138 is driven through a driver 142.

The coil 138 is normally deenergized and the contacts 136 normally are opened. The contacts 136 are connected to the conductors 90 and 92 and the contacts 136 are connected to an auxiliary telephone port in such a manner that the repair person can assign the customer's telephone number to the selected cable pair 18 by connecting the selected cable pair 18 to the auxiliary telephone number port.

When the processor 38 receives a test condition command code uniquely identifying that the selected cable pair is to be connected to the auxiliary telephone number port, the processor 38 provides the signal on the signal path 72 for energizing the coil 138 thereby closing the contacts 136 and connecting the conductors 90 and 92 to ground. Assuming the selected cable pair is the particular cable pair 18b, the relay 80b previously would have been operated to close the contacts 82b and 84b. Since the conductors 90 and 92 have connected to the selected cable pair 18b, the selected cable pair 18b automatically now is connected to the auxiliary telephone number port through the contacts 136 of the relay 134.

From the foregoing, it will be obvious to those skilled in the art, that other functions may be added to the cable pair test unit 36 in a manner similar to the ground tip network 40, the ground ring network 42, the short network 44, the tone network 46 and the auxiliary telephone network 48 described in detail before.

Figure 5:
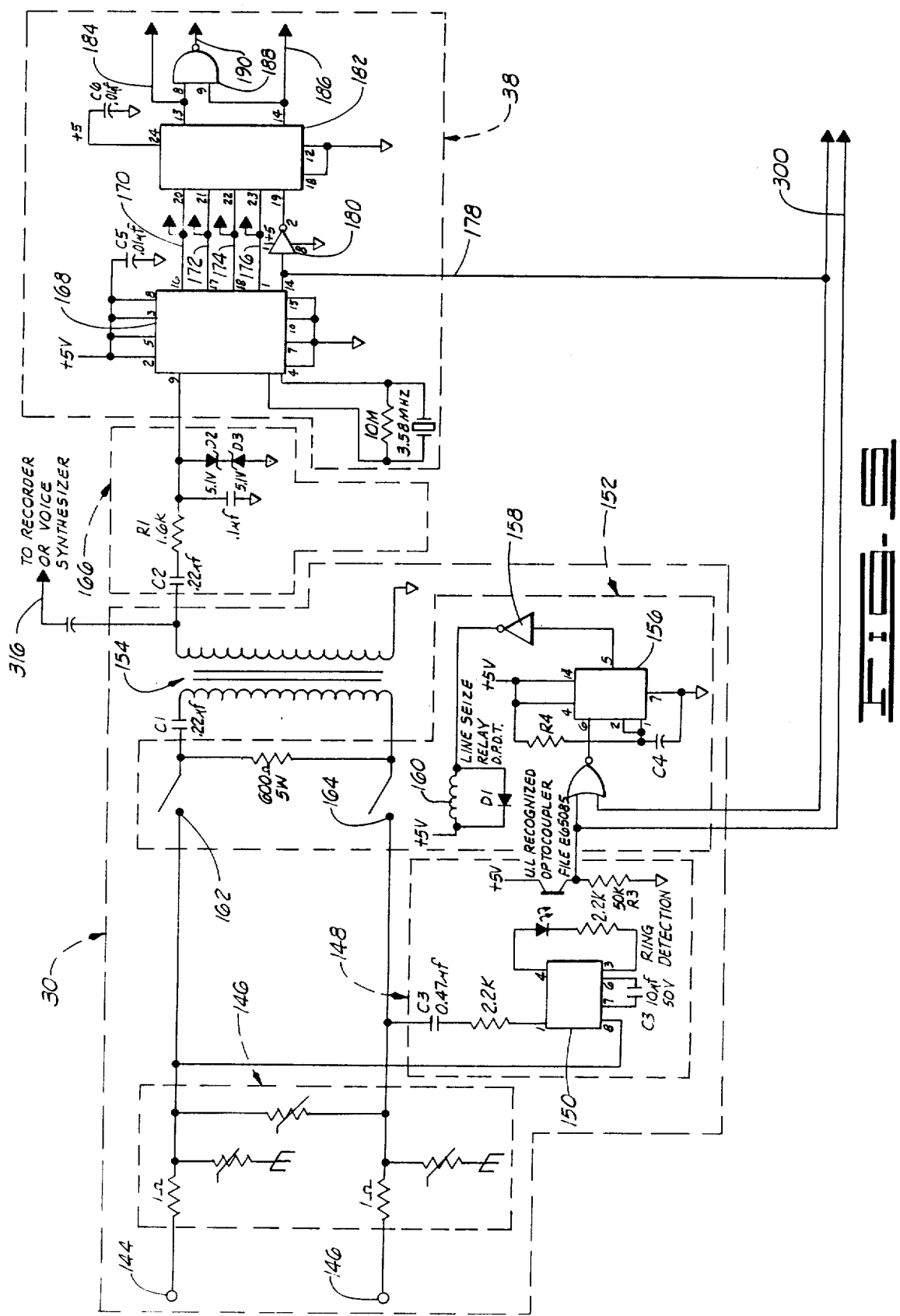
FIG. 5 is a schematic view of a modem and a portion of the processor portion of the cable pair tester.
Figure 6:
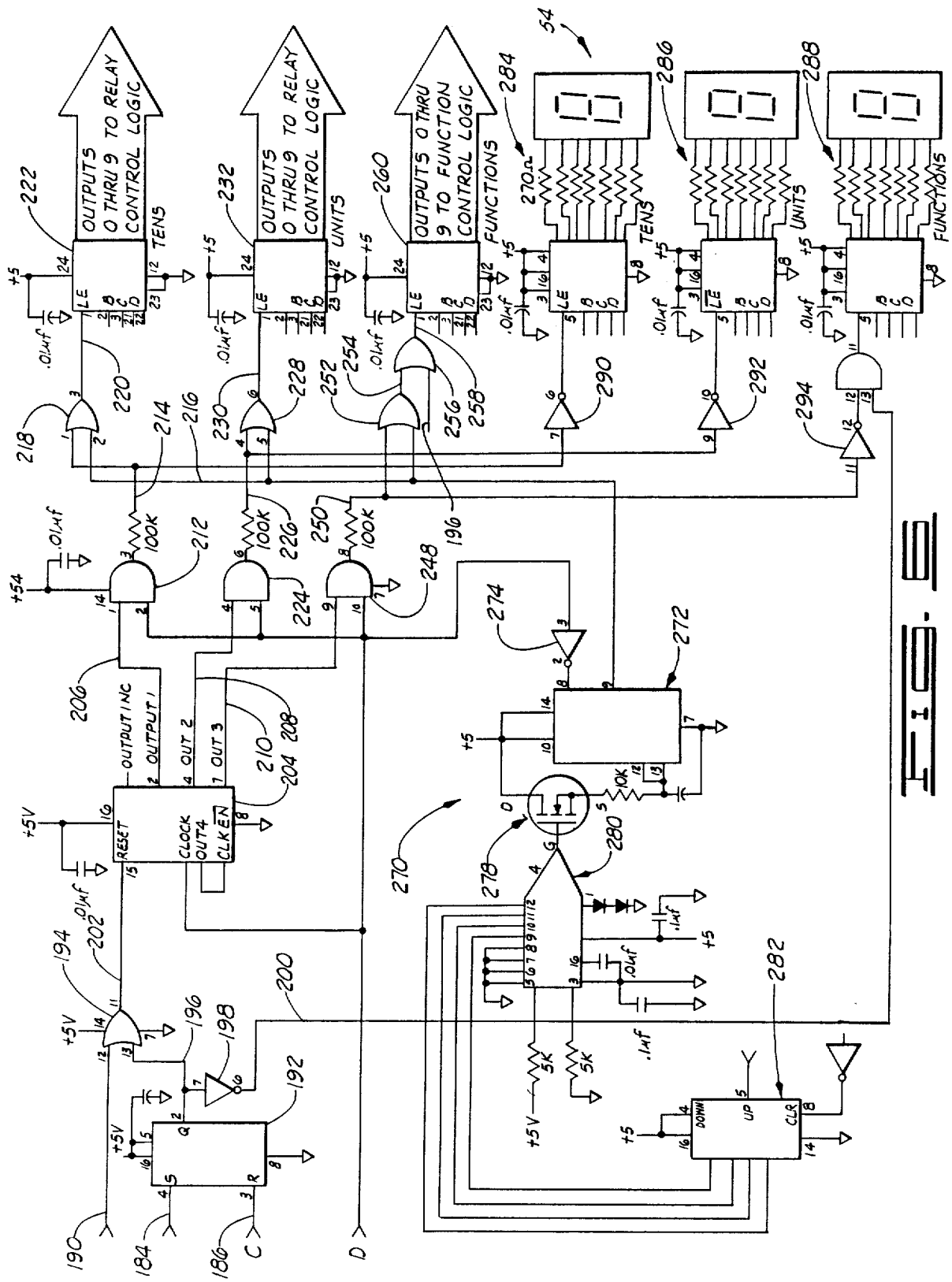
FIG. 6 is a schematic view of the processor portion of the cable, pair test unit and a schematic view of the display portion of the cable pair test unit.
Figure 7:
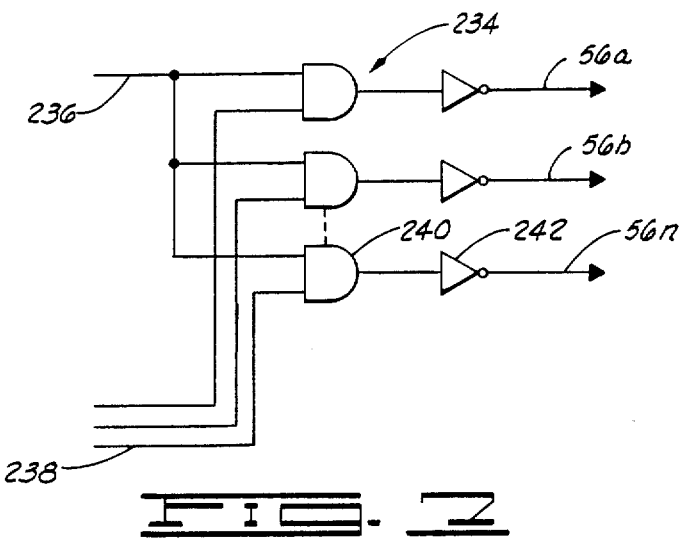
FIG. 7 is a schematic view of the relay control logic portion of processor portion of the cable pair test unit.

In the particular embodiment of the invention illustrated in the drawings and particularly in FIGS. 5, 6, and 7, certain tones or buttons on a typical touch tone telephone have been dedicated to the following functions:

| Button No. | Function |
|---|---|
| 1 | Tip Ground |
| 2 | Ring Ground |
| 3 | Short |
| 4 | Tone |
| 5 | Auxiliary Telephone |
| 6 | Annunciator Bypass |

In addition, the buttons designated with the "*" symbol and with the "#" symbol on a typical touch tone telephone also have dedicated functions with respect to the particular embodiment with the present invention shown in the drawings, as will be described in greater detail below. The numbered buttons on the touch tone telephone also are utilized to designated the selected cable pair 18 in a manner which will be described in greater detail below.

In operation, the repair person connects the repair touch tone telephone 24 to an existing, in-use cable pair 18 and presses selected buttons on the touch tone telephone to generate the cable pair tester connection code. In other words, the repair person dials the telephone number dedicated to the cable pair tester 26 by depresses designated buttons on the repair touch tone telephone 24 in the proper sequence. In response to receiving a cable pair connection code corresponding to the telephone number of the cable pair tester 36, the modem 30 answers the telephone call and provides an off-hook condition on the cable pair 18 used by the repair person in calling the cable pair tester 26.

In response to the modem 30 receiving the cable pair tester connection code corresponding to the cable pair tester 26, the modem 30 outputs a signal on the signal path 34 to the processor 38 and the processor 38 provides an output signal on the signal path 76 to the annunciator network 50. The annunciator network 50 then provides the recorded announcement or the tone signal over the signal path 78 through the modem 30 to the repair touch tone telephone 24. The prerecorded announcement provided by the annunicator 50 may comprise instructions to the repair person for operating the repair touch tone telephone 24 to select cable pairs 18 and place predetermined test conditions on the selected cable pair. It should be noted that, in some embodiments of the present invention, the annunicator network 50 providing the prerecorded message can be bypassed if desired, in a manner to be described in greater detail below.

The telephone repair person then selects a cable pair 18 to be tested by generating a cable pair command code corresponding to the selected cable pair. For example, assume that the cable pair 18n was designated by the numeral "02". In this example, the repair person would depress the "#" button and then depress the "02" buttons on the repair touch tone telephone 24 thereby generating the cable pair command code indicating the selected cable pair 18n to be "02". The cable pair command code is transmitted over the cable pair 18b connecting the repair touch tone telephone 24 to the main frame 14 and to the cable pair tester 26 by way of the connector 28 and the modem 30. In response to receiving the cable pair command code indicating the designated or selected cable pair to be the cable pair designated with the numeral "02", the processor 38 outputs a signal over the signal path 56 to the select cable pair network 52 and the cable pair network 2 in response to receiving this signal, establishes electrical continuity between the cable pair 18n designated by the numeral "02" and the cable pair tester 26. Referring to FIG. 3 and again assuming that the selected cable pair is 18n and designated by the numeral "02", the processor would output the signal on the signal path 56n energizing the coil 86n and closing the contacts 82n and 84n thereby establishing electrical continuity between the selected cable pair 18n and the function bus comprising the conductors 90 and 92.

Once the cable pair 18n has been selected and electrical continuity has been established between the cable pair 18n and the cable pair tester 26, the repair person then can automatically place any one of the test conditions on the selected cable pair 18n by generating the proper test condition command codes. For example, assuming the repair person desired to place a ground on the tip 20 of the selected cable pair 18n, the repair person would depress the button on the repair touch tone telephone 24 designated by the numeral "1" thereby generating the test condition command code indicating that a ground should be placed on the tip 20 of the selected cable pair 18n.

In response to receiving the test condition command code indicating that a ground should be placed on the tip 20 of the selected cable pair 18n, the processor generates a HIGH signal over the signal path 58 to the ground tip network 40. The HIGH signal on the signal path 58 is inverted by the inverter 102 thereby placing a LOW signal on the coil 98, opposite the side of the coil connected to the five volt supply, thereby energizing the coil 98 and closing the contacts 96. The closing the contacts 96 establishes electrical continuity between the tip 20 of the selected cable pair 18n by way of the conductor 90 and ground thereby establishing electrical continuity between the tip 20 of the selected cable pair 18n and ground. The tip 20 of the selected cable pair 18n will remain connected to ground as long as the repair person maintains the button designated by the numeral "1" on the repair touch tone telephone 24 in the depressed condition. When the repair person releases the button designated by the numeral "1" on the repair touch tone telephone 24, the processor 38 in response thereto outputs a LOW signal on the signal path 58 for deenergizing the coil 98 and opening the contacts 94 thereby disconnecting the tip 20 from ground, or in other words, interrupting the electrical continuity between the tip 20 of the selected cable pair 18n and ground.

The repair person could select another cable pair 18 and place the same or some other test condition on the selected cable pair 18, in a manner similar to that described before. Also, the cable pair test unit 36 is adapted so that, once the cable pair 18 has been selected, the repair person can place any of the test conditions on the cable pair in any sequence by depressing the "*" button and the button with the desired corresponding function.

Assuming the cable pair 18n has been selected and assuming the repair person now desired to place a ground on the ring 22 of the selected cable pair 18n, the repair person would depress the "*" button and then the "2" button on the repair touch tone telephone 24 thereby generating the test condition command code (*2) indicating that a ground should be placed on the ring 22 of the selected cable pair 18n.

In response to receiving the test condition command code (*2) indicating that a ground should be placed on the ring 22 of the selected cable pair 18n, the processor generates a HIGH signal over the signal path 62 to the ring tip network 42. The HIGH signal on the signal path 62 is inverted by the invertor 112 thereby placing a LOW signal on the coil 108, opposite the side of the coil 108 connected to the five volt supply, thereby energizing the coil 108 and closing the contacts 106. The closing the contacts 106 establishes electrical continuity between the ring 22 of the selected cable pair 18n by way of the conductor 92 and ground thereby establishing electrical continuity between the ring 22 of the selected cable pair 18n and ground. The ring 22 of the selected cable pair 18n will remain connected to ground as long as the repair person maintains the button designated by the numeral "2" on the repair touch tone telephone 24 in the depressed condition. When the repair person releases the button designated by the numeral "2" on the repair touch tone telephone 24, the processor 38 in response thereto outputs a LOW signal on the signal path 62 for deenergizing the coil 108 and opening the contacts 106 thereby disconnecting the ring 22 from ground, or in other words, interrupting the electrical continuity between the ring 22 of the selected cable pair 18n and ground.

Assuming the cable pair 18n has been selected and assuming the repair person now desired to place a short across the selected cable pair 18n, the repair person would depress the "*" and "3" buttons on the repair touch tone telephone 24 thereby generating the test condition command code (*3) indicating that a short should be placed across the selected cable pair 18n.

In response to receiving the test condition command code (*3) indicating that a short should be placed across the selected cable pair 18n, the processor generates a HIGH signal over the signal path 66 to the short network 44. The HIGH signal on the signal path 66 is inverted by the invertor 122 thereby placing a LOW signal on the coil 118, opposite the side of the coil 118 connected to the five volt supply, thereby energizing the coil 118 and closing the contacts 116. The closing the contacts 116 connects a short across the selected cable pair 18n. The short across the selected cable pair 18n will remain as long as the repair person maintains the "3" button in the depressed condition. When the repair person releases the "3" button, the processor 38 in response thereto outputs a LOW signal on the signal path 66 for deenergizing the coil 118 and opening the contacts 116 thereby disconnecting the short from the selected cable pair 18n.

Assuming the cable pair 18n has been selected and assuming the repair person desired to connect the selected cable pair 18n to the tone generator, the repair person would depress the "*" and "4" buttons on the repair touch tone telephone 24 thereby generating the test condition command code (*4) indicating that the tone generator should be connected to the selected cable pair 18n.

In response to receiving the test condition command code (*4) indicating that the tone generator should be connected to the selected cable pair 18n, the processor generates a HIGH signal over the signal path 30 to the tone network 46. The HIGH signal on the signal path 70 is inverted by the invertor 132 thereby placing a LOW signal on the coil 128, opposite the side of the coil 128 connected to the five volt supply, thereby energizing the coil 128 and closing the contacts 126. The closing the contacts 126 establishes electrical continuity between the selected cable pair 18n and the tone generator, thereby causing a tone signal to be outputted over the selected cable pair 18n. The tone generator will remain connected to the selected cable pair 18n as long as the repair person maintains the "4" button in the depressed condition. When the repair person releases the "4" button, the processor 38 in response thereto outputs a LOW signal on the signal path 70 for deenergizing the coil 128 and opening the contacts 126 thereby disconnecting the selected cable pair 18n from the tone generator.

Assuming the cable pair 18n has been selected and assuming the repair person desired to connect the auxiliary telephone number port to the selected cable pair 18n, the repair person would depress the "*" and "5" buttons on the repair touch tone telephone 24, thereby generating the test condition command code (*5) indicating that the auxiliary telephone number port should be connected to the selected cable pair 18n.

In response to receiving the test condition command code (*5), the processor generates a HIGH signal over the signal path 72 to the auxiliary telephone network 48. The HIGH signal on the signal path 72 is inverted by the invertor 142 thereby placing a LOW signal on the coil 138, opposite the side of the coil 138 connected to the five volt supply, thereby energizing the coil 138 and closing the contacts 136. The closing the contacts 136 establishes electrical continuity between the selected cable pair 18n and the auxiliary telephone number port. The auxiliary telephone number port will remain connected to the selected cable pair 18n as long as the repair person maintains the "5" button in the depressed condition. When the repair person releases the "5" button, the processor 38 in response thereto outputs a LOW signal on the signal path 72 for deenergizing the coil 138 and opening the contacts 136 thereby disconnecting the selected cable pair 18n from the auxiliary telephone number port.

Referring to FIG. 5, shown schematically therein is a detail of one embodiment of the modem 30 which may be used in the present invention. The modem 30 includes a tip connector 144 and a ring connector 145 for connecting the modem 30 to the tip and ring 20 and 22 of the cable pair 18 dedicated to the cable pair tester 26 or, in other words, corresponding to the telephone number of the cable pair tester 6. A surge protection network 146 is interposed in the tip and ring connectors 144 and 145 for suppressing transient voltages.

The modem 30 includes a ring detection network 148 for detecting a ring condition entering on the tip and ring connectors 144 and 145. The basic element of the ring detection network 148 is a ring detection chip 150 capable of generating an output in response to detecting a ring condition on the tip and ring conductors 144 and 145. Ring detection chips capable of operating in the manner described before with respect to the ring detection chip 150 are commercially available such as from Texas Instruments, Model No. TCM 520A.

The modem 30 also includes a line seizure network 152. The line seizure network 152 receives an output from the ring detection network 148 indicating a ring condition received on the tip and ring conductors 144 and 145 and the line seizure network 152 operates to seize the cable pair 18 calling the modem 30 and to place an off-hook condition on the seized cable pair. The seized cable pair then is connected to the modem 30 and an off-hook condition is placed on the seized cable pair, the seized cable pair being coupled to the modem output by way of a transformer 154.

The particular line seizure network 152 shown in FIG. 5 includes a timer 156 which is a commercially available timer such as sold by National Semiconductor and designated by the Model No. 556. The timer 156 provides an output through an inverter 158 for driving or energizing a coil 160, thereby closing contacts 162 and 164 in response to the ring detection network 148 output signal indicating the reception of incoming signal or call on the tip and ring connectors 144 and 145.

Modems constructed to operate in the manner described before with respect to the modem 30 shown in FIG. 5 are commercially available Such commercially available modems will perform the functions described before with respect to the modem 30, although commercially available modems may include different components and different arrangements of the particular elements with respect to the particular components and arrangement shown in FIG. 5 for the modem 30. It also should be noted that some modems may not include the transformer 154 and, in these instances, the transformer 154 would be provided as part of the processor 38.

The output of the modem 30 is connected to the input of the processor 38 and a portion of the processor 38 is shown in FIG. 5.

The output of the modem 30 is connected to the input of the processor 38 through a line coupling and filter network 166 to the input of a dual tone multiple frequency network 168. The dual tone multiple frequency network 168 is constructed and adapted to receive tone signals inputted thereto and to convert the received tones or tone signals to a BCD output provided on conductors or signal paths 170, 172, 174 and 176. In addition, the dual tone multiple frequency network 168 is adapted to provide an output HIGH signal on a signal path 178 in response to receiving a valid tone inputted thereto. Dual tone multiple frequency networks which are adapted to operate the manner described before with respect to the dual tone multiple frequency network 168 are commercially available from various sources such as Teltone Company designated by the Model No. M-957.

The output HIGH signal on the signal path 178 indicating a valid tone inputted to the dual tone multiple frequency network 168 is inverted by an inverter 180 and the inverted LOW signal is inputted into the enable port of a demultiplexer 182. The demultiplexer 182 decodes the BCD signal inputted thereto. The demultiplexer 182, as shown in FIG. 5, has two outputs, one on a signal path 184 and one a signal path 186. The outputs of the demultiplexer 182 on the signal paths 184 and 186 are normally HIGH. The demulitplexer 182 is adapted to provide an output LOW on the signal path 184 in response to decoding a BCD input indicating a received tone corresponding to a depressed "*" button on a touch tone telephone. Further, the demultiplexer 182 is adapted to provide an output LOW on the signal path 186 in response to decoding a BCD input indicating a received tone corresponding to a depressed "#" button on a touch tone telephone.

Demultiplexers constructed to operate in the manner described before with respect to the demultiplexer 182 are commercially available such as the demultiplexer available from National Semiconductor designated by the Model No. 74C154.

The outputs of the demultiplexer 182 on the signal paths 184 and 186 are connected to the input of a NAND gate 188. The NAND gate 188 provides a HIGH output in response to receiving inputs which are not both HIGH or both LOW.

Assuming the repair person is operating the cable pair tester 26 to select a particular cable pair, the cable repair person first would first depress the "#" function or button on the repair touch tone telephone 24 and in this condition, the output of the demultiplexer 182 on the signal path 186 would go LOW, the signal on the signal path 184 would be HIGH and thus the output of the NAND gate 188 on the signal path 190 would be HIGH.

The outputs on the signal paths 184 and 186 are connected to the input of a NAND logic flip-flop 192, shown in FIGS. 6. The output of the NAND gate 188 on the signal path 190 is connected to the input of an OR gate 194 shown in FIG. 6.

The flip-flop 192 is reset (output changes state) in response to receiving a LOW signal on the signal path 186. Thus, when the "#" function is depressed on the repair touch tone telephone 24, the flip-flop 192 receives a LOW signal on the signal path 186 thereby resetting (changing the state of) the output on the signal path 196 so that an output LOW is provided on the signal path 196 outputted from the flip-flop 192. The output of the flip-flop 192 is inverted by an inverter 198 to provide a HIGH signal on a signal path 200, for reasons which will be made more apparent below.

The output of the flip-flop 192 on the signal path 196 also is inputted into the OR gate 194. Since the OR gate 194 is receiving an input HIGH on the signal path 190 and an input LOW on the signal path 196, the OR gate 194 outputs a HIGH signal on a signal path 202.

The HIGH output signal on the signal path 202 from the OR gate 194 is inputted into a ring counter 204. As indicated in FIG. 6, the first output of the ring counter 204 is not utilized and the ring counter 204 has three other outputs on signal paths 206, 208 and 210. An input HIGH on the signal path 202 resets the ring counter 204 and thus the ring counter 204 is reset in response to the repair person depressing the button indicated with the "#" function. The HIGH signal on the signal path 178 outputted by the dual tone multiple frequency network 168 indicating a valid tone signal had been received is inputted into the clock input of the ring counter 204 and clocks the output of the ring counter 204 so that the first output ring counter 204 goes HIGH. Since the first output of the ring counter 204 is not connected to any of the other logic in the processor 38, nothing further happens at this stage of the operation except the repair person has condition the processor 38 for now receiving the cable pair command code.

In the particular embodiment of the cable pair tester 26 illustrated in the drawings, the cable pairs are designated by two numerals "00" through "99". Assuming the selected cable pair 18n is designated by the numerals "02" and after depressing the "#" button as described before, the repair person depresses first the "0" button on the repair touch tone telephone 24 and then depresses the "2" button on the repair touch tone telephone 24. When the repair person depresses the "0" button on the repair touch tone telephone 24, the dual tone multiple frequency network 168 output on the signal path 178 again goes HIGH and clocks the ring counter 204 so that the ring counter 204 output on the signal path 206 goes HIGH. The HIGH ring counter 204 output on the signal path 206 and the HIGH on the signal path 178 indicating a valid touch tone code has been received are both inputted into an AND gate 212. In response to receiving the two HIGH inputs, the AND gate 212 outputs a HIGH on a signal path 214. The HIGH on the signal path 214 and a LOW on a signal path 216 each are inputted into an OR gate 218 and, in response thereto, the OR gate outputs a HIGH on the signal path 220.

The HIGH on the signal path 220 is inputted into the enable port of a latching demultiplexer 222. The BCD outputs of the dual tone multiple frequency network 168 on the signal paths 170, 172, 174 and 176 also are inputted into the latch demultiplexer 222, is indicated in FIG. 6 by the letters "BCD". The latching demultiplexer 222 has ten outputs designated in FIG. 6 by the numerals 0 through 9. The latching demultiplexer 222 is constructed and adapted to decode the BCD inputted thereto on the signal paths 170, 172, 174 and 176 when enabled in response to receiving a HIGH on the signal path 220 and to provide a HIGH on the output thereof corresponding to the decimal designation of the BCD inputted thereto. In this example, the latching demultiplexer 222 would provide an output on the "0" output line in response to decoding the BCD input indicating that a "0" button had been depressed by the repair person. The outputs of the latching demultiplexer 222 are connected to a relay control logic 234 portion of the processing 38, shown in FIG. 7.

The repair person then would depress the numeral "2" on the repair touch tone telephone 24. This would cause the dual multiple frequency network 168 output on the signal path 178 again to go HIGH and clock the ring counter 204 so that the output on the signal path 208 would go HIGH.

The HIGH output on the signal path 208 and the HIGH output on the signal path 178 each are inputted into an AND gate 224 and, in response thereto, the AND gate 224 outputs a HIGH on a signal path 226. The HIGH on the signal path 226 and a LOW on a signal path 216 each are inputted into an OR gate 228. The OR gate 228 outputs a HIGH on a signal path 230 in response to receiving the HIGH on the signal path 226 and the LOW on the signal path 216. The HIGH on the signal path 230 is inputted into the enable port of a latching demultiplexer 232 thereby enabling the latching demultiplexer 232.

The latching demultiplexer 232 is constructed and operates exactly like the latching demultiplexer 222. The BCD outputs of the dual tone multiple frequency network 168 on the signal paths 170, 172, 174 and 176 each are also inputted into the input of the latching demultiplexer 232, as indicated by the letters "BCD" in FIG. 6. The latching demultiplexer 232 is constructed and adapted to decode the BCD signal inputted thereto on the signal paths 170, 172, 174 and 176. The latching demultiplexer 232 has ten output signal paths designated in FIG. 6 as outputs "0" through "9". The latching demultiplexer 232 provides an output HIGH on the signal path designated by the numeral represented by the BCD code inputted thereto and decoded by the latching demultiplexer 232. In this example, assuming the selected cable pair 18n is represented by the numerals "03", the BCD inputted into the latching demultiplexer 232 would represent the numeral "2" and the number "2" output line of the latching demultiplexer 232 would go HIGH. The outputs of the latching demultiplexer 232 are connected to the relay control logic 234 portion of the processor 38, as shown in FIG. 7.

Again, assuming the selected cable pair 18n is designated by the numerals "02", the latching demultiplexer 222 would output a HIGH on the "0" signal path 236 (shown in FIG. 7) and the latching demultiplexer 232 would output a HIGH on the "2" output thereof providing a high on a signal path 238 shown in FIG. 7. The HIGH outputs on the signal paths 236 and 238 are connected to an AND gate 240 which outputs a HIGH in response thereto on a signal path 242 the HIGH on the signal path 242 is inverted by an inverter 244 which provides an output LOW on the signal path 56n.

The LOW on the signal path 56n is connected to the coil 86n thereby energizing the coil 86n and closing the contacts 82n and 84n for establishing electrical continuity between the selected cable pair 18n designated by the numerals "02" and the cable pair tester 26 by way of the function bus comprising the conductors 90 and 92.

The relay control logic 234 portion of the processor 38 shown in FIG. 7 includes AND gates positioned similar to the AND gate 240 and inverters positioned similar to the inverter 244 for energizing the coils 86a and 86b shown in FIG. 3 in a manner described before with respect to energizing the coil 86n. In addition, the relay control logic 234 also includes other AND gates and other inverters for energizing other coils and closing other contacts connected to additional cable pairs (not shown). Only three cable pairs 18 have been shown in FIG. 3 and only the portion of the relay control logic 234 for connecting any one of these three cable pairs 18 to the cable pair tester 26 have been shown in FIGS. 3 and 7 and the connecting of additional cable pairs 18 would be accomplished in the same manner as illustrated in FIGS. 3 and 7 with respect to these three cable pairs 18.

Thus, by the repair person depressing the "#" and then the "02" buttons on the touch tone telephone 24, the repair person has connected the cable pair 18n designated by the numeral "02" to the cable pair tester 26. In this example, by depressing of the "#" and the "0" and the "2" buttons on the repair touch tone telephone 24, the repair person has generated the cable pair command code (#02) for connecting the selected cable pair 18n designated by the numerals "02" to the cable pair tester 26. This cable pair 18n will remain connected to the cable pair tester 26 since the outputs of the latching demultiplexers 222 and 232 are latched and will remain as latched until the demultiplexers 222 and 232 are disenabled by receiving LOWs on the respective signal paths 220 and 230.

Assuming the repair person now desires to connect the tip 20 of the selected cable pair 18n to ground, the repair person depresses the buttons "*" and "1" on the repair touch tone telephone 24, thereby generating the test condition command code (*1) indicating the connection of the tip 20 of the selected cable pair 18n to ground. The tone generated by depressing the "*" button is inputted into the dual tone multiple frequency network 168 which outputs a BCD code on the signal paths 170, 172, 174 and 176 in the manner described before. The dual tone multiple frequency network 168 also outputs a HIGH on the signal path 178 indicating the reception of a valid tone code or signal.

The BCD output of the dual tone multiple frequency network 168 is inputted into the demultiplexer 182 which outputs LOW on the signal path 184 indicating the reception of a BCD code indicating a "*" function. The output on the signal path 186 is HIGH and thus the output of the NAND gate 188 on the signal path 190 is HIGH.

The OR gate 194 output remains LOW and the output HIGH on the signal path 178 clocks the ring counter 204 so the ring counter 204 outputs on the signal path 210 goes HIGH. The HIGH on the signal path 210 and the HIGH on the signal path 178 each are inputted into an AND gate 248 causing the output of the AND gate 248 to go HIGH. The AND gate 248 output on the signal path 250 and the LOW on the signal path 216 each are inputted into an OR gate 252 which outputs a HIGH on the signal path 254 in response thereto. The HIGH on the signal path 254 and a LOW on the signal path 196 each are inputted into an OR gate 256 which outputs a HIGH on a signal path 258.

The HIGH on the signal path 258 is inputted into the enable input of a latching demultiplexer 260. The latching demultiplexer 260 also has inputted thereto the BCD code on the signal paths 170, 172, 174 and 176 as indicated by the letters "BCD" in FIG. 7. The latching demultiplexer 260 operates to decode the BCD signal inputted thereto when enabled and to cause one of ten outputs to go HIGH depending on the BCD code inputted thereto. Since only the "*" button has been depressed, the latching demultiplexer 260 does not output a HIGH on any of the outputs thereof at this time.

The repair person then completes the test condition command cod by depressing the "1" button. The tone generated by the depressing of the "1" button on the repair touch tone telephone 24 is inputted into the dual tone multiple frequency network 168 and the dual tone multiple frequency network 168 outputs a BCD code on the signal paths 170, 172, 174 and 176 indicative of the numeral "1". The dual tone multiple frequency network 168 also provides a HIGH output on the signal path 178 indicating a valid touch tone code has been received. Since the demultiplexer 182 provides outputs only in response to decoded inputs indicating the depression of the "*" or the "#" buttons on the touch tone telephone, the outputs of the demultiplexer 182 will remain the same.

The BCD outputs of the dual tone multiple frequency network 168 outputted on the signal paths 170, 172, 174 and 176 also are inputted into the latching demultiplexer 260, as described before. The latching demultiplexer 260 has ten outputs designated in FIG. 6 as outputs "0" through "9". The outputs of the latching demultiplexer 260 are connected to the function control logic as indicated in FIG. 6, the function control logic being shown in FIG. 4. It should be noted that one of the outputs "designated by the function " 6"is connected to the annunicator network 50 for overriding the recorded message in a manner to be described below.

In this example, the repair person depressed the "1" button on the repair touch tone telephone 24 and thus the latching demultiplexer 260 output on the "1" output goes HIGH.

The "1" output of the latching demultiplexer 260 is connected to the signal path 58 and the signal on the signal path 58 thus goes HIGH. As shown in FIG. 4, the HIGH on the signal path 58 is inverted by the inverter 102 thereby causing the coil 98 to be energized for closing the contacts 96 and connecting the tip 20 of the selected cable pair 18n to ground by way of the conductor 90. The tip 20 of the selected cable pair 18n will remain connected to ground by the closing of the contacts 96 as long as the repair person maintains the numeral "1" button on the repair touch tone telephone 24 in the depressed state. When the operator releases the "1" button on the repair touch tone telephone 24, the latching demultiplexer 260 output on the "1" signal path goes LOW.

The second output of the latching demultiplexer 260 is connected to the signal path 62. Thus, by depressing the numeral "2" on the repair touch tone telephone 24, the repair person will cause the coil 108 to be energized thereby closing the contacts 106 and connecting the ring 22 of the selected cable pair 18n to ground as long as the operator maintains the "2" button in the depressed state. Thus, the repair person effects the ring ground test condition in a manner exactly like that described before with respect to the tip ground test condition, except the operator generates the test condition command code comprising the depression of the numeral "2" on the repair touch tone telephone 24 for causing the ring 22 of the select cable pair 18n to be connected to ground. In other words, it is not necessary to repeat the depression of the "*" button.

If the repair person then desires the test condition of short to be connected to the selected cable pair 18n, the repair person depresses the numeral "3" on the repair touch tone telephone 24 thereby generating the test condition command code indicating the placing of a short across the selected cable pair 18n. The depressing of the "3" button on the repair touch tone telephone 24 causes the latching demultiplexer 260 to output a HIGH on the numeral "3" output thereof. The "3" output of the latching demultiplexer 260 is connected to the signal path 66. A HIGH on the signal path 66 is inverter by the inverter 120 for energizing the coil 118 and closing the contacts 116 thereby placing a short on the selected cable repair 18n.

Assuming the repair person then wanted to place a tone on the selected cable pair 18n, the repair person would depress the numeral "4" on the repair touch tone telephone 24, thereby causing the numeral "4" output of the latching demultiplexer 260 to go HIGH. The numeral "4" output of the latching demultiplexer 260 is connected to the signal path 70. The HIGH on the signal path 70 causes the coil 128 to be energized thereby closing the contact 126 and connecting the tone generator to the selected cable pair 18.

If the repair person then desired to connect the auxiliary telephone number port to the selected cable pair 18n, the operator would depress the numeral "5" on the repair touch tone telephone 24. The depression of the numeral "5" button on the repair touch tone telephone 24 would cause the numeral "5" output of the latching demultiplexer 260 to go HIGH. The numeral "5" output of the latching demultiplexer 260 is connected to the signal path 72. The HIGH on the signal path 72 energizes the coil 138 for closing the contacts 136 thereby connecting the auxiliary telephone number port to the selected cable pair 18n.

It will be obvious to those skilled in the art that other functions could be added for remote activation by the repair person in a manner similar to the ground tip network 40, the ground ring network 42, the short network 44, the tone network 46 and the auxiliary telephone network 48.

The processor 38 also includes a timing network 270 as shown in FIG. 6. The timing network 270 is constructed and adapted to disenable the latching demultiplexers 222, 232 and 260 after the lapse of a predetermined period of time without receiving a valid tone code. The timing network 270 is connected to the number "9" output of the latching demultiplexer 260 so the repair person can override the timing network 270 by depressing the numeral "9" in the same manner the repair person enabled the ground tip network 40 or any of the other functions similar to the ground tip network 40 described in detail before.

As shown in FIG. 6, the signal path 178 is connected to the reset input of a dual timer 272 by way of an inverter 274. Thus each time a valid tone code is received and the signal path 178 goes HIGH, a LOW is inputted into the dual timer 272 thereby resetting the dual timer 272.

The dual timer 272 is adapted to provide an output LOW on the signal path 216 until the predetermined time programmed into the timer 272 has elapsed and then the dual timer 272 outputs a HIGH on the signal path 216 which disenables the latching demultiplexers 222, 232 and 260.

The elasped time required for the dual timer 272 to output a HIGH on the signal path 216 is determined by a MOSFET transistor 278 which is connected to the dual timer 272 and to a programmable potentiometer 280. The programmable potentiometer 280 provides a variable resistance controlled by the BCD output of a down counter 282 and is determined by which connections of the programmable potentiometer 280 are connected to the BCD outputs of the down counter 282. Thus, the resistance of the variable potentiometer 280 can be varied to control the elapsed time required by the dual timer 272 to output the HIGH on the signal path 216. For example, the dual timer 272 might be preset to provide a HIGH on the signal path 216 after the elapsed of thirty minutes.

The cable pair test unit 36 also includes the display 54 shown schematically in FIG. 6. The display 54 consists of three display units 284, 286 and 288. Each display unit 284, 286 and 288 includes a decoder for decoding a BCD signal inputted thereto and providing a decoded output for driving a seven segment display.

The enable to the display unit 284 is connected to the signal path 214 by way of an inverter 290. The BCD outputs of the dual tone multiple frequency network 168 provided on the signal path 170, 172, 174 and 176 also are inputted into the seven segment display 284, as indicated in FIG. 6 by the letters "BCD".

The enable input of the display unit 286 is connected to the signal path 226 by way of an inverter 292. The BCD output of the dual tone multiple frequency network 168 provided on the signal paths 170, 172, 174 and 176 also are inputted into the display unit 286, as indicated in FIG. 6 by the letters "BCD".

The enable input to the display unit 288 is connected to the signal path 250 by way of an inverter 294. The BCD outputs of the dual tone multiple frequency network 168 provided on the signal paths 170, 172, 174 and 176 also are inputted into the display unit 288, as indicated in FIG. 6 by the letters "BCD".

Thus, when the latching demultiplexer 222 is enabled, the display unit 284 also is enabled. By the same token, when the latching demultiplexer 232 is enabled, the display unit 286 is enabled and, when the latching demultiplexer 260 is enabled, the display unit 288 is enabled.

Following the example utilized before when the selected cable pair 18n was designated by the numerals "02" the display unit 284 would be enabled and display a "0" in response to the depression of the "0" button on the repair touch tone telephone 24. By the same token the display unit 286 would be enabled and would display the numeral "2" in response to the depression of the numeral "2" button on the repair touch tone telephone 24. Thus, the display units 284 and 286 would output respectively the numerals "0" and "2" thereby providing a visually perceivable output indication that the selected cable pairs identified by the numeral "02".

By the same token and following the example utilized before, if the repair person then depressed the "*1" buttons on the touch tone telephone 24 indicating the desire to connect the tip 20 of the selected cable pair 18n to ground, the display unit 288 would be enabled with the enabling of the latching demultiplexer 260 and the display unit 288 would output the numeral "1" thereby providing a visually perceivable output indication that the function or test condition numeral "1" had been selected, the test condition being the connecting of the tip 20 of the selected cable pair 18n to ground.

Figure 8:
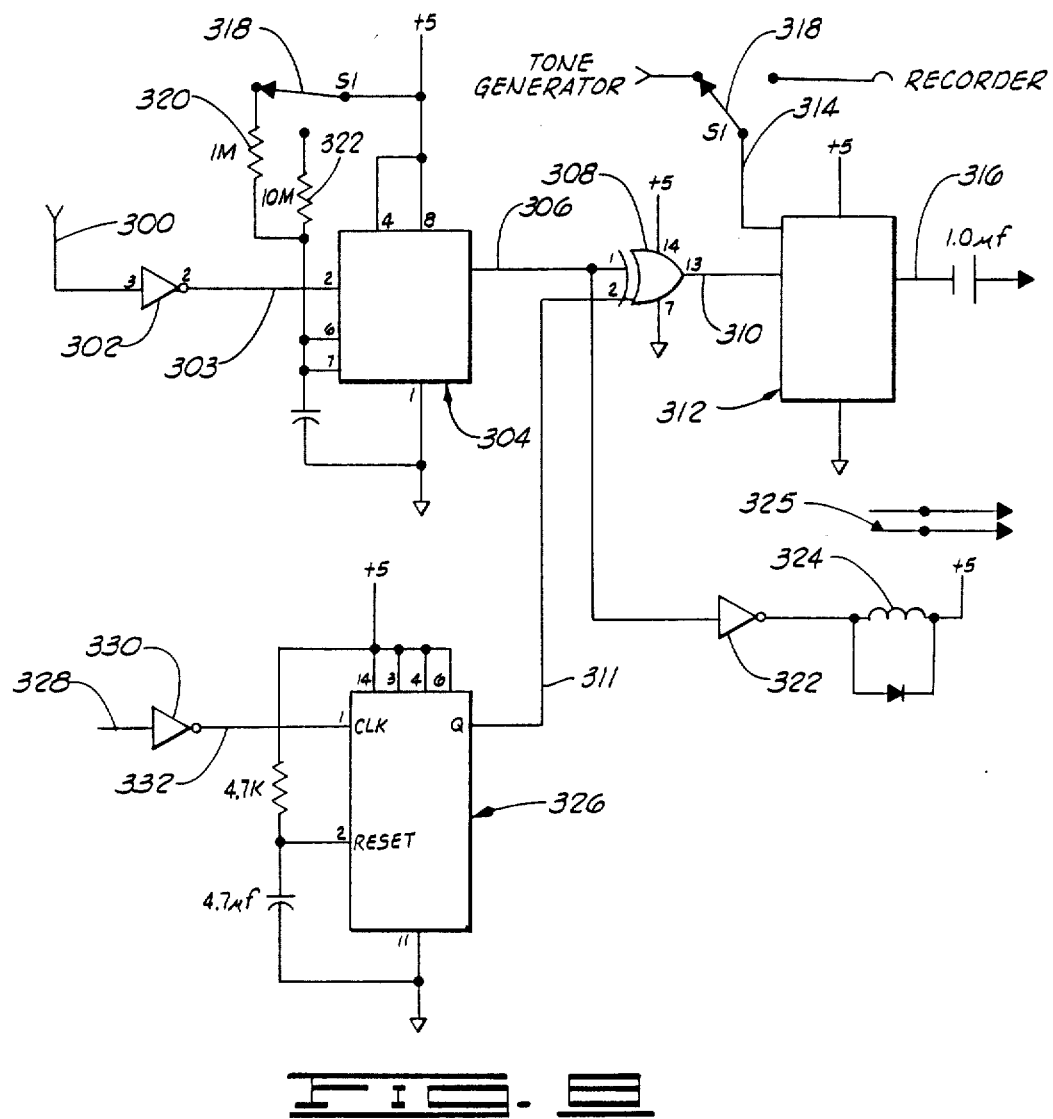
FIG. 8 is a schematic view of the annunicator portion of the cable pair test unit.

In the embodiment of the cable pair test unit 26 shown in FIGS. 2 and 8, the cable pair test unit 36 is constructed and adapted to provide either a short duration tone or a prerecorded message in response to the cable pair test unit 36 being connected to a particular cable pair 18 through the modem 30 or, in other words, in response to an individual accessing the cable pair tester 26 by dialing the designated cable pair tester connection code. This function is provided by the annunciator network 50 which is schematically shown in FIG. 8. The output of the ring detection network 148 indicating the reception of the cable pair tester connection code identifying this particular cable pair tester 26, is provided on a signal path 300, as shown in FIG. 5. The signal on the signal path 300 will be in a HIGH state in response to the detection of a ring signal.

This HIGH signal on this signal path 300 is connected to an inverter 302 as shown in FIG. 8. The inverter 302, in response to receiving the HIGH signal on the signal path 300, outputs a LOW on a signal path 304 which is connected to and inputted into an announcement timer 304 the announcement timer 304 provides an output HIGH on a signal path 306 for a predetermined period of time as set in the announcement timer 304 in a manner to be described in greater detail below.

The HIGH on the signal path 306 is inputted into an exclusive OR gate 308. A LOW on a signal path 311 also is inputted into the exclusive OR gate 308 and, in response to receiving the HIGH on the signal path 306 and the LOW on the signal path 311, the exclusive OR gate 308 outputs a HIGH on a signal path 310. The HIGH on the signal path 310 is inputted into an analog switch 312. In response to receiving the HIGH on the signal path 310, the analog switch 312 outputs the input signal received by the analog switch 312 on a signal path 314, the analog switch 312 output being outputted on a signal path 316 which is outputted through the modem 30 as indicated in FIGS. 2 and 5.

The analog switch 312 input 314 can be connected either to a tone generator or to a recorder or voice synthesizer, as indicated in FIG. 8. The input signal path 314 has a switch 318 interposed therein. In one position of the switch 318, as specifically shown in FIG. 8, the switch 318 is connected to the tone generator and, in this position of the switch 318, the analog switch 312 outputs the tone generator output through the modem 30. The switch 318 is a double pole double throw type of switch so that, when the switch 318 is connected to the tone generator as indicated in FIG. 8, the switch 318 also is connected to a resistor 320 which is included as a part of the input network to the announcement timer 304 thereby causing the timer 304 to have a short duration time period. When the announcement timer 304 times out the short duration time, the timer output on the signal path 306 goes LOW thereby causing the analog switch 312 to disconnect the tone generator output from the analog switch 312 output on the signal path 316.

If it is desired to output the recorded message on a recorder or voice synthesizer, the switch 318 is moved from the position shown in FIG. 8 to the position indicating the connection to the recorder or voice synthesizer. The switch 18 simultaneously is moved to connect the switch to a resistor 322 which is a part of the announcement timer 304 timing input. The connection of the switch 318 to the resistor 322 causes the announcement timer 304 to have a longer duration time period before outputting a LOW on the signal path 306 to allow time for the recorded message to be output through the modem 30.

Assuming the recorded message is on a cassette recorder, it also is necessary to start the cassette recorder for outputting the recorded message. Thus, the announcement timer 304 output on the signal path 306 also is inputted into an inverter 322 which outputs a LOW in response thereto for energizing a coil 324. The energizing of the coil 324 causes a contact 325 on the recorder start jack to be closed thereby starting the recorder.

The announcement network 50 also includes a flip-flop 326. The flip-flop 326 is adapted to normally provide a LOW on the output signal path 311, thereby enabling the recorded message to be outputted in the manner described before. However, in the embodiment of the invention shown in FIGS. 6 and 8, the repair person can override the announcement if desired or, in other words, the repair person can delete the announcement if the repair person already knows how to operate the cable pair tester 26.

To delete the announcement, the repair person depresses the "*6" on the repair touch tone telephone 24. Thus, enables the latching demultiplexer 260 and causes the latching demultiplexer 260 to output a HIGH on the number "6" output thereof. The number "6" output of the latching demultiplexer 260 is connected to a signal path 328 shown in FIG. 8.

The HIGH on the signal path 318 is inverted by an inverter 330 which outputs a LOW on a signal path 332. The signal path 332 is connected to the clock input of the flip-flop 326, thereby clocking the flip-flop 326 and causing the output thereof on the signal path 311 to go HIGH. With the output on the signal path 311 HIGH, the input to the analog switch 312 will be LOW, thereby preventing the recorded message from being outputted on the signal path 316.

Figure 9:
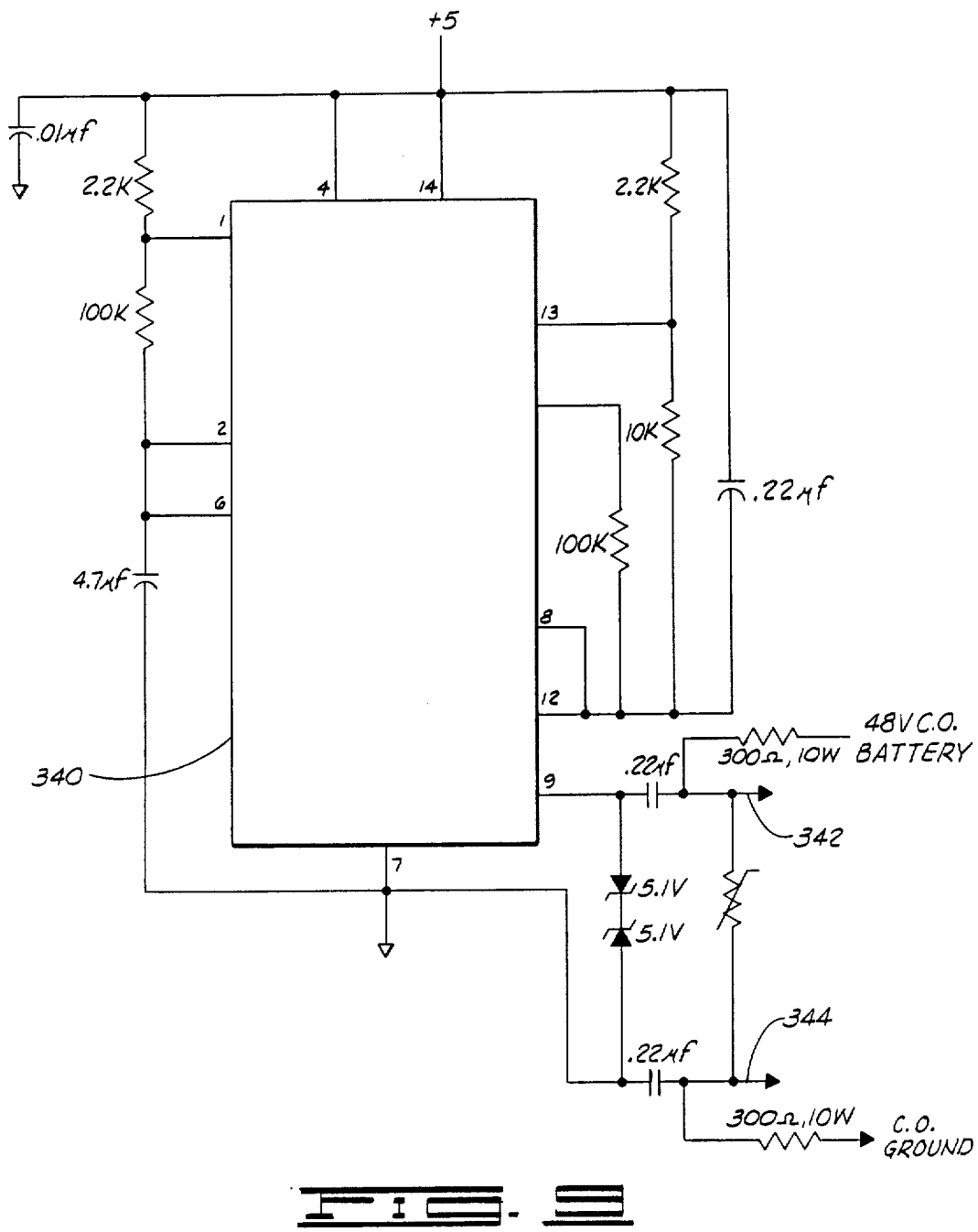
FIG. 9 is a schematic view of a tone generator.

Shown in FIG. 9 is a tone generator 340 which is constructed and adapted to output a tone signal at the output signal paths 342 and 344. The tone generator 340 outputs 342 and 344 are connected to the switch 318 in FIG. 8 where indicated by the words "TONE GENERATOR". In addition the tone generator 340 outputs on the signal paths 342 and 344 also are connected to the contacts 126 in FIG. 4 where indicated by the words "TONE GEN.".

The various parts described herein are commercially available. The following is a list of some of the significant parts with typical manufacturers and model numbers:

| Part Name | Typical Manufacturer | Model No. |
|---|---|---|
| 1. Dual Tone Multiple Frequency Network 16 | Teltone Company | M-957 |
| 2. Demultiplexer 182 | National Semiconductor | 74C154 |
| 3. Flip Flop 192 | National Semiconductor | 4044 |
| 4. Ring Counter 204 | National Semiconductor | 4017 |
| 5. Latching Demultiplexers 222, 232 and 260 | National Semiconductor | 4514 |
| 6. Dual Timer 272 | National Semiconductor | 556 |
| 7. Programmable Timer 280 | National Semiconductor | DAC800 |
| 8. Counter 282 | National Semiconductor | 74C193 |
| 9. Announcement Timer 304 | National Semiconductor | 556 |
| 10. Analog Switch 312 | National Semiconductor | 4066 |
| 11. Flip Flop 316 | National Semiconductor | 74C73 |
| 12. Tone Generator 340 | National Semiconductor | 556 |

Changes may be made in the construction and operation of the various assemblies networks and components described herein or in the steps or sequence of steps of the methods described herein without departing from the spirit and the scope of the invention as defined in the following claims.

What is claimed is:

1. An apparatus adapted for use with a plurality of cable pairs for placing on a selected cable pair at least one test condition selected from the group of test conditions comprising (1) placing a ground on the tip of the selected cable pair, (2) placing a group condition on the ring of the selected cable pair, and (3) placing a short across the selected cable pair, each cable pair comprising a tip and a ring, comprising:

a cable pair tester having a portion connected to each of the plurality of cable pairs with electrical continuity being interrupted between the cable pairs and the cable pair tester, the cable pair tester establishing electrical continuity between a selected one of the cable pairs and the cable pair tester in response to receiving a cable pair command code uniquely identifying the selected cable pair, the cable pair tester receiving at least one test condition command code wherein each test condition command code uniquely identifies the test condition to be placed on the selected cable pair and the cable pair tester placing the selected test condition on the selected cable pair in response to receiving the test condition command code uniquely identifying the selected test condition, the cable pair tester comprising at least one of the following networks:

a ground tip network adapted to place a ground condition on the tip of the selected cable pair in response to the cable pair tester receiving the test condition command code uniquely identifying the test condition of placing the ground on the tip of the selected cable pair, the ground condition being placed on the tip of the selected cable pair after electrical continuity has been established between the selected cable pair and the cable pair tester in response to receiving the cable pair command code uniquely identifying the selected cable pair:

a ground ring network adapted to place a ground condition on the ring of the selected cable pair in response to receiving the test condition command code uniquely identifying the test condition of placing the ground on the ring of the selected cable pair the ground condition being placed on the ring of the selected cable pair after electrical continuity has been established between the selected cable pair and the cable pair tester:

a short network adapted to place a short across the selected cable pair in response to receiving a signal from the processor indicating the processor has received the test condition command code uniquely identifying the test condition of placing the short across the selected cable pair, the short being placed across the selected cable pair after electrical continuity has been established between the selected cable pair and the cable pair tester: and means remote from the cable pair tester for supplying the cable pair command code and the test condition command codes.

2. The apparatus of claim 1, wherein the cable pair test or is defined further to include:

a select cable pair network connected to each of the cable pairs, a portion of the select cable network interrupting the electrical continuity between each of the cable pairs and the cable pair tester in one condition of the select cable pair network, the select cable pair network being adapted to establish electrical continuity between the selected cable pair and the cable pair tester in response to receiving a signal indicating the selected cable pair; and a processor receiving the cable pair command code and outputting a signal identifying the selected cable pair uniquely identified in the received cable pair command code, the signal outputted by the processor indicating the selected cable pair in the received cable pair command code being connected to the select code pair network and the select cable pair network establishing electrical continuity between the selected cable pair identified by the signal received from the processor and the cable pair tester.

3. The apparatus of claim 2 wherein one of the test conditions is defined as the placing of the ground condition on the tip of the selected cable pair, and wherein the ground tip network is adapted to place the ground condition on the tip of the selected cable pair in response to receiving the signal from the processor indicating the processor has received the test condition command code uniquely identifying the test condition of placing the ground on the tip of the selected cable pair, the ground condition being placed on the tip of the selected cable pair after electrical continuity has been established between the selected cable pair and the cable tester by way of the select cable pair network; and wherein the processor is defined further as being adapted to receive the test condition command code uniquely identifying the test condition of placing a ground on the tip of the selected cable pair and in response thereto output the signal to the ground tip network for causing the ground tip network to place a ground on the tip of the selected cable pair, and wherein the means for supplying the test condition command codes is defined further as supplying the test condition command code uniquely identifying the test condition of placing a ground on the tip of the selected cable pair.

4. The apparatus of claim 2 wherein one of the test conditions is the placing of the ground condition on the ring of the selected cable pair, the ground ring network adapted to place a ground condition on the ring of the selected cable pair in response to receiving a signal from the processor indicating the processor has received the test condition command code uniquely identifying the test condition of placing the ground on the ring of the selected cable pair, the ground condition being placed on the ring of the selected cable pair after electrical continuity has been established between the selected cable pair and the cable tester by way of the select cable network; and wherein the processor is defined further as being adapted to receive the test condition command code uniquely identifying the test condition of placing a ground on the ring of the selected cable pair and in response thereto output the signal to the ground ring network for causing the ground ring network to place a ground on the ring of the selected cable pair, and wherein the means for supplying the test condition command code is define further as supplying the test condition command code uniquely identifying the test condition of placing a ground on the ring of the selected cable pair.

5. The apparatus of claim 2 wherein one of the test conditions is the placing of a short across of the selected cable pair, and wherein the short network adapted to place the short across the selected cable pair in response to receiving a signal from the processor indicating the processor has received the test condition command code uniquely identifying the test condition of placing the short across the selected cable pair, the short being placed across the selected cable pair after electrical continuity has been established between the selected cable pair and the cable tester by way of the select cable pair network; and wherein the processor is defined further as being adapted to receive the test condition command code uniquely identifying the test condition of placing a short across the selected cable pair and in response thereto output a signal to the short network for causing the short network to place a short across the selected cable pair, and wherein the means for supplying the test condition command codes is defined further as supplying the test condition command code uniquely identifying the test condition of placing a short across the selected cable pair.

6. The apparatus of claim 2 wherein one of the test conditions is the placing of a tone signal on the selected cable pair, and wherein the cable pair tester is defined further to include:
 a means for generating a tone signal; and
 a tone network adapted to place a tone signal on the selected cable pair in response to receiving a signal from the processor indicating the processor has received the test condition command code uniquely identifying the test condition of placing a tone signal on the selected cable pair, the tone signal being placed on the selected cable pair after electrical continuity has been established between the selected cable pair and the cable tester by way of the select cable pair network; and wherein the processor is defined further as being adapted to receive the test condition command code uniquely identifying the test condition of placing a tone signal on the selected cable pair and in response thereto output a signal to the tone network for causing the tone network to place a tone signal on the selected cable pair, and wherein the means for supplying the test condition command codes is defined further as supplying the test condition command code uniquely identifying the test condition of placing a tone signal on the selected cable pair.

7. The apparatus of claim 3 wherein one of the test conditions is defined as the placing of a ground condition on the tip of the selected cable pair and wherein one of the other test conditions is defined as the placing of a ground condition on the ring of the selected cable pair and wherein the ground tip network is adapted to place the ground condition on the tip of the selected cable pair in response to receiving a signal from the processor indicating the processor has received the test condition command code uniquely identifying the test condition of placing the ground on the tip of the selected cable pair, the ground condition being placed on the tip of the selected cable pair after electrical continuity has been established between the selected cable pair and the cable pair tester by way of the select cable pair network, and wherein the ground ring network is adapted to place a ground condition on the ring of the selected cable pair in response to receiving a signal from the processor indicating the processor has received the test condition command code uniquely identifying the test condition of placing the ground on the ring of the selected cable pair, the ground condition being placed on the ring of the selected cable pair after electrical continuity has been established between the selected cable pair and the cable pair tester by way of the select cable pair network; and wherein the processor is defined further as being adapted to receive the test condition command code uniquely identifying the placing of the ground on the tip of the selected cable pair and in response thereto output the signal to the ground tip network for causing the ground tip network to place a ground on the tip of the selected cable pair, and wherein the processor is defined further as being adapted to receive the test condition command code uniquely identifying the test condition of placing a ground on the ring of the selected cable pair and in response thereto output the signal to the ground ring network for causing the ground ring network to place a ground on the ring of the selected cable pair, and wherein the means for supplying the test condition command codes is defined further as supplying the test condition command codes uniquely identifying the test of placing a ground on the tip of the selected cable pair and for supplying the test condition command code uniquely identifying the test condition of placing a ground on the ring of the selected cable pair.

8. The apparatus of claim 7 wherein one of the test conditions is the placing of a short across of the selected cable pair, and wherein the short network is adapted to place the short across the selected cable pair in response to receiving a signal from the processor indicating the processor has received the test condition command code uniquely identifying the test condition of placing the short across the selected cable pair, the short being placed across the selected cable pair after electrical continuity has been established between the selected cable pair and the cable tester by way of the select cable pair network; and wherein the processor is defined further as being adapted to receive the test condition command code uniquely identifying the test condition of placing a short across the selected cable pair and in response thereto output a signal to the short network for causing the short network to place a short across the selected cable pair, and wherein the means for supplying the test condition command codes is defined further as supplying the test condition command code uniquely identifying the test condition of placing a short across the selected cable pair.

9. The apparatus of claim 8 wherein one of the test conditions is the placing of a tone signal on the selected cable pair, and wherein the cable pair tester is defined further to include:
a means for generating a tone signal; and
a tone network adapted to place a tone signal on the selected cable pair in response to receiving a signal from the processor indicating the processor has received the test condition command code uniquely identifying the test condition of placing a tone signal on the selected cable pair, the tone signal being placed on the selected cable pair after electrical continuity has been established between the selected cable pair and the cable tester by way of the select cable pair network; and
wherein the processor is defined further as being adapted to receive the test condition command code uniquely identifying the test condition of placing a tone signal on the selected cable pair and in response thereto output a signal to the tone network for causing the tone network to place a tone signal on the selected cable pair, and wherein the means for supplying the test condition command codes is defined further as supplying the test condition command code uniquely identifying the test condition of placing a tone signal on the selected cable pair.

10. The apparatus of claim 2 wherein the select cable pair network comprises:
a plurality of relays, each relay being interposed between one of the cable pairs and the cable pair tester and each relay having an opened condition for interrupting electrical continuity between the cable pair associated therewith and the cable pair tester and each relay having a closed position for establishing electrical continuity between the cable pair connected thereto and the cable pair tester, each of the relays being normally opened so that electrical continuity normally is interrupted between each of the cable pairs and the cable pairs testers; and wherein the processor is defined further as being adapted to output the signal to the relay interposed in the selected cable pair in response to receiving the cable pair command code for closing the relay and establishing electrical continuity between the selected cable pair and the cable pair tester.

11. The apparatus of claim 3 wherein the ground tip network is defined further to include:
a conductor connected to the tip of each of the cable pairs and another conductor connected to the ring of each of the cable pairs;
means for connecting the conductor connected to the tip of each of the cable pairs to ground; and
a relay interposed in the means for connecting the tip of each of the cable pairs to ground, the relay having a normally opened position for interrupting electrical continuity in said means and ground, the relay being closed in response to receiving the signal from the processor in response to the processor receiving the test condition command code indicating the test condition of placing a ground on the tip of the selected cable pair thereby establishing electrical continuity in said means and connecting the tip of the selected cable pair to ground.

12. The apparatus of claim 4 wherein the ground ring network is defined further to include:
a conductor connected to the tip of each of the cable pairs and another conductor connected to the ring of each of the cable pairs;
means for connecting the conductor connected to the ring of each of the cable pairs to ground; and
a relay interposed in the means for connecting the ring of each of the cable pairs to ground, the relay having a normally opened position for interrupting electrical continuity in said means and ground, the relay being closed in response to receiving the signal from the processor in response to the processor receiving a test condition command code indicating the test condition of placing a ground on the ring of the selected cable pair thereby establishing electrical continuity in said means and connecting the ring of the selected cable pair to ground.

13. The apparatus of claim 5 wherein the short network is defined further to include:
a conductor connected to the tip of each of the cable pairs and another conductor connected to the ring of each of the cable pairs;
means for establishing a short across the conductors connected to each of the tips and each of the rings; and
a relay interposed in the means for establishing a short, the relay having a normally opened position for interrupting electrical continuity in said means, the relay being closed in response to receiving the signal from the processor in response to the processor receiving a test condition command code indicating the test condition of placing a short across the selected cable pair thereby establishing electrical continuity in said means and connecting the short across the selected cable pair to ground.

14. The apparatus of claim 6 wherein the tone network is defined further to include:
a conductor connected to the tip of each of the cable pairs and another conductor connected to the ring of each of the cable pairs;
means for connecting the conductors connected to tip and ring of each of the cable pairs said means for generating the tone signal; and a relay interposed in said means for connecting the conductors to the means for generating the tone signal, the relay having a normally opened position for interrupting electrical continuity in said means for connecting the conductors to the means for generating the tone signal, the relay being closed in response to receiving the signal from the processor in response to the processor receiving the test condition command code indicating the test condition of connecting a tone signal to the selected cable pair, thereby connecting tone signal to the selected cable pair.

15. The apparatus of claim 7 wherein the ground tip network is defined further to include:
 a conductor connected to the tip of each of the cable pairs and another conductor connected to the ring of each of the cable pairs;
 means for connecting the conductor connected to the tip of each of the cable pairs to ground; and
 a relay interposed in the means for connecting the tip of each of the cable pairs to ground, the relay having a normally opened position for interrupting electrical continuity in said means and ground, the relay being closed in response to receiving the signal from the processor in response to the processor receiving the test condition command code indicating the test condition of placing a ground on the tip of the selected cable pair thereby establishing electrical continuity in said means and connecting the tip of the selected cable pair to ground; and
wherein the ground ring network is defined further to include:
 a conductor connected to the ring of each of the cable pairs and another conductor connected to the ring of each of the cable pairs;
 means for connecting the conductor connected to the ring of each of the cable pairs to ground; and
 a relay interposed in the means for connecting the ring of each of the cable pairs to ground, the relay having a normally opened position for interrupting electrical continuity in said means and ground, the relay being closed in response to receiving the signal from the processor in response to the processor receiving a test condition command code indicating the test condition of placing a ground on the ring of the selected cable pair thereby establishing electrical continuity in said means and connecting the ring of the selected cable pair to ground.

16. The apparatus of claim 8 wherein the short network is defined further to include:
 a conductor connected to the tip of each of the cable pairs and another conductor connected to the ring of each of the cable pairs;
 means for establishing a short across the conductors connected to each of the tips and each of the rings; and
 a relay interposed in the means for establishing a short, the relay having a normally opened position for interrupting electrical continuity in said means, the relay being closed in response to receiving the signal from the processor in response to the processor receiving a test condition command code indicating the test condition of placing a short across the selected cable pair thereby establishing electrical continuity in said means and connecting the short across the selected cable pair to ground.

17. The apparatus of claim 9 wherein the tone network is defined further to include:
 a conductor connected to the tip of each of the cable pairs and another conductor connected to the ring of each of the cable pairs;
 means for connecting the conductors connected to tip and ring of each of the cable pairs said means for generating the tone signal; and
 a relay interposed in said means for connecting the conductors to the means for generating the tone signal, the relay having a normally opened position for interrupting electrical continuity in said means for connecting the conductors to the means for generating the tone signal, the relay being closed in response to receiving the signal from the processor in response to the processor receiving the test condition command code indicating the test condition of connecting a tone signal to the selected cable pair, thereby connecting the tone signal to the selected cable pair.

18. The apparatus of claim 1 wherein the cable pair tester is defined further to include:
 a modem connected to the processor for receiving calls over an existing telephone line, the modem answering received telephone calls and connecting the received telephone calls to the processor, the cable pair command codes and the test condition command codes being in the received telephone calls; and wherein the means for supplying the cable pair command codes and the test condition command codes is defined further as being a touch tone telephone and cable pair command codes and the test condition command codes each are defined further as being tone signals generated by the touch tone telephone.

19. An apparatus adapted for use with a plurality of cable pairs for placing on a selected cable pair at least one test condition selected from the group of test conditions comprising (1) placing a ground on the tip of the selected cable pair, (2) placing a group condition on the ring of the selected cable pair, and (3) placing a short across the selected cable pair, each cable pair comprising a tip and ring, comprising:
 a cable pair tester having a portion connected to each of the plurality of cable pairs with electrical continuity being interrupted between the cable pairs and the cable pair tester, the cable pair tester receiving a cable pair command code and establishing electrical continuity between a selected one of the cable pairs and the cable pair tester in response to receiving the cable pair command code uniquely identifying the selected cable pair, the cable pair tester receiving at least one test condition command code wherein each test condition command code uniquely identifies the test condition to be placed on the selected cable pair and the cable pair tester placing the selected test condition on the selected cable pair in response to receiving the test condition command code uniquely identifying the selected test condition, the cable pair tester comprising at least one of the following networks:
 a ground tip network adapted to place a ground condition on the tip of the selected cable pair in response to the cable pair tester receiving the test condition command code uniquely identifying the test condition of placing the ground on the tip of the selected cable pair, the ground condition being placed on the tip of the selected cable pair after electrical continuity has been established between the selected cable pair and the cable pair tester in response to receiving the cable pair command code uniquely identifying the selected cable pair:

a ground ring network adapted to place a ground condition on the ring of the selected cable pair in response to receiving the test condition command code uniquely identifying the test condition of placing the ground on the ring of the selected cable pair the ground condition being placed on the ring of the selected cable pair after electrical continuity has been established between the selected cable pair and the cable pair tester; and a short network adapted to place a short across the selected cable pair in response to receiving a signal from the processor indicating the processor has received the test condition command code uniquely identifying the test condition of placing the short across the selected cable pair, the short being placed across the selected cable pair after electrical continuity has been established between the selected cable pair and the cable pair tester, 20. The apparatus of claim 19 wherein the cable pair tester is defined further to include:

a select cable pair network connected to each of the cable pairs, a portion of the select cable network interrupting the electrical continuity between each of the cable pairs and the cable pair tester in one condition of the select cable pair network, the select cable pair network being adapted to establish electrical continuity between the selected cable pair and the cable pair tester in response to receiving a signal indicating the selected cable pair; and a processor receiving the cable pair command code and outputting a signal identifying the selected cable pair uniquely identified in the received cable pair command code, the signal outputted by the processor indicating the selected cable pair in the received cable pair command code being connected to the select cable pair network and the select cable pair network establishing electrical continuity between the selected cable pair identified by the signal received from the processor and the cable pair tester.

21. The apparatus of claim 20 wherein one of the test conditions is defined as the placing of the ground condition on the tip of the selected cable pair, and wherein the ground tip network is adapted to place the ground condition on the tip of the selected cable pair in response to receiving the signal from the processor indicating the processor has received the test condition command code uniquely identifying the test condition of placing the ground on the tip of the selected cable pair, the ground condition being placed on the tip of the selected cable pair after electrical continuity has been established between the selected cable pair and the cable tester by way of the select cable pair network; and wherein the processor is defined further as being adapted to receive the test condition command code uniquely identifying the test condition of placing a ground on the tip of the selected cable pair and in response thereto output the signal to the ground tip network for causing the ground tip network to place a ground on the tip of the selected cable pair, and wherein the means for supplying the test condition command codes is defined further as supplying the test condition command code uniquely identifying the test condition of placing a ground on the tip of the selected cable pair.

22. The apparatus of claim 20 wherein one of the test conditions is the placing of the ground condition on the ring of the selected cable pair, the ground ring network adapted to place a ground condition on the ring of the selected cable pair in response to receiving a signal from the processor indicating the processor has received the test condition command code uniquely identifying the test condition of placing the ground on the ring of the selected cable pair, the ground condition being placed on the ring of the selected cable pair after electrical continuity has been established between the selected cable pair and the cable tester by way of the select cable network; and wherein the processor is defined further as being adapted to receive the test condition command code uniquely identifying the test condition of placing a ground on the ring of the selected cable pair and in response thereto output the signal to the ground ring network for causing the ground ring network to place a ground on the ring of the selected cable pair, and wherein the means for supplying the test condition command code is define further as supplying the test condition command code uniquely identifying the test condition of placing a ground on the ring of the selected cable pair.

23. The apparatus of claim 20 wherein one of the test conditions is the placing of a short across of the selected cable pair, and wherein the short network adapted to place the short across the selected cable pair in response to receiving a signal from the processor indicating the processor has received the test condition command code uniquely identifying the test condition of placing the short across the selected cable pair, the short being placed across the selected cable pair after electrical continuity has been established between the selected cable pair and the cable tester by way of the select cable pair network; and wherein the processor is defined further as being adapted to receive the test condition command code uniquely identifying the test condition of placing a short across the selected cable pair and in response thereto output a signal to the short network for causing the short network to place a short across the selected cable pair, and wherein the means for supplying the test condition command codes is defined further as supplying the test condition command code uniquely identifying the test condition of placing a short across the selected cable pair.

24. The apparatus of claim 20 wherein one of the test conditions is the placing of a tone signal on the selected cable pair, and wherein the cable pair tester is defined further to include:

a means for generating a tone signal; and a tone network adapted to place a tone signal on the selected cable pair in response to receiving a signal from the processor indicating the processor has received the test condition command code uniquely identifying the test condition of placing a tone signal on the selected cable pair, the tone signal being placed on the selected cable pair after electrical continuity has been established between the selected cable pair and the cable tester by way of the select cable pair network; and wherein the processor is defined further as being adapted to receive the test condition command code uniquely identifying the test condition of placing a tone signal on the selected cable pair and in response thereto output a signal to the tone network for causing the tone network to place a tone signal on the selected cable pair, and wherein the means for supplying the test condition command codes is defined further as supplying the test condition command code uniquely identifying the test condition of placing a tone signal on the selected cable pair.

25. The apparatus of claim 22 wherein one of the test conditions is defined as the placing of a ground condition on the tip of the selected cable pair and wherein one of the other test conditions is defined as the placing of a ground condition on the ring of the selected cable pair, and wherein the ground tip network is adapted to place the ground condition on the tip of the selected cable pair in response to receiving a signal from the processor indicating the processor has received the test condition command code uniquely identifying the test condition of placing the ground on the tip of the selected cable pair, the ground condition being placed on the tip of the selected cable pair after electrical continuity has been established between the selected cable pair and the cable pair tester by way of the select cable pair network, and wherein the ground ring network is adapted to place a ground condition on the ring of the selected cable pair in response to receiving a signal from the processor indicating the processor has received the test condition command code uniquely identifying the test condition of placing the ground on the ring of the selected cable pair, the ground condition being placed on the ring of the selected cable pair after electrical continuity has been established between the selected cable pair and the cable pair tester by way of the select cable pair network; and wherein the processor is defined further as being adapted to receive the test condition command code uniquely identifying the placing of the ground on the tip of the selected cable pair and in response thereto output the signal to the ground tip network for causing the ground tip network to place a ground on the tip of the selected cable pair, and wherein the processor is defined further as being adapted to receive the test condition command code uniquely identifying the test condition of placing a ground on the ring of the selected cable pair and in response thereto output the signal to the ground ring network for causing the ground ring network to place a ground on the ring of the selected cable pair, and wherein the means for supplying the test condition command codes is defined further as supplying the test condition command codes uniquely identifying the test of placing a ground on the tip of the selected cable pair and for supplying the test condition command code uniquely identifying the test condition of placing a ground on the ring of the selected cable pair.

26. The apparatus of claim 7 wherein one of the test conditions is the placing of a short across of the selected cable pair, and wherein the short network is adapted to place the short across the selected cable pair in response to receiving a signal from the processor indicating the processor has received the test condition command code uniquely identifying the test condition of placing the short across the selected cable pair, the short being placed across the selected cable pair after electrical continuity has been established between the selected cable pair and the cable tester by way of the select cable pair network; and wherein the processor is defined further as being adapted to receive the test condition command code uniquely identifying the test condition of placing a short across the selected cable pair and in response thereto output a signal to the short network for causing the short network to place a signal across the selected cable pair, and wherein the means for supplying the test condition command codes is defined further as supplying the test condition command code uniquely identifying the test condition of placing a short across the selected cable pair.

27. The apparatus of claim 26 wherein one of the test conditions is the placing of a tone signal on the selected cable pair, and wherein the cable pair tester is defined further to include:
a means for generating a tone signal; and
a tone network adapted to place a tone signal on the selected cable pair in response to receiving a signal from the processor indicating the processor has received the test condition command code uniquely identifying the test condition of placing a tone signal on the selected cable pair, the tone signal being placed on the selected cable pair after electrical continuity has been established between the selected cable pair and the cable tester by way of the select cable pair network; and wherein the processor is defined further as being adapted to receive the test condition command code uniquely identifying the test condition of placing a tone signal on the selected cable pair and in response thereto output a signal to the tone network for causing the tone network to place a tone signal on the selected cable pair, and wherein the means for supplying the test condition command codes is defined further as supplying the test condition command code uniquely identifying the test condition of placing a tone signal on the selected cable pair.

28. The apparatus of claim 20 wherein the select cable pair network comprises:
a plurality of relays, each relay being interposed between one of the cable pairs and the cable pair testor and each relay having an opened condition for interrupting electrical continuity between the cable pair associated therewith and the cable pair tester and each relay having a closed position for establishing electrical continuity between the cable pair connected thereto and the cable pair tester, each of the relays being normally opened so that electrical continuity normally is interrupted between each of the cable pairs and the cable pairs testers; and
wherein the processors is defined further as being adapted to output the signal to the relay interposed in the selected cable pair in response to receiving the cable pair command code for closing the relay and establishing electrical continuity between the selected cable pair and the cable pair tester.

29. The apparatus of claim 21 wherein the ground tip network is defined further to include:
a conductor connected to the tip of each of the cable pairs and another conductor connected to the ring of each of the cable pairs;
means for connecting the conductor connected to the tip of each of the cable pairs to ground; and
a relay interposed in the means for connecting the tip of each of the cable pairs to ground, the relay having a normally opened position for interrupting electrical continuity in said means and ground, the relay being closed in response to receiving the signal from the processor in response to the processor receiving the test condition command code indicating the test condition of placing a ground on the tip of the selected cable pair thereby establishing electrical continuity in said means and connecting the tip of the selected cable pair to ground.

30. The apparatus of claim 22 wherein the ground ring network is defined further to include:

a conductor connected to the tip of each of the cable pairs and another conductor connected to the ring of each of the cable pairs;

means for connecting the conductor connected to the ring of each of the cable pairs to ground; and a relay interposed in the means for connecting the ring of each of the cable pairs to ground, the relay having a normally opened position for interrupting electrical continuity in said means and ground, the relay being closed in response to receiving the signal from the processor in response to the processor receiving a test condition command code indicating the test condition of placing a ground on the ring of the selected cable pair thereby establishing electrical continuity in said means and connecting the ring of the selected cable pair to ground.

31. The apparatus of claim 23 wherein the short network is defined further to include:

a conductor connected to the tip of each of the cable pairs and another conductor connected to the ring of each of the cable pairs;

means for establishing a short across the conductors connected to each of the tips and each of the rings; and a relay interposed in the means for establishing a short, the relay having a normally opened position for interrupting electrical continuity in said means, the relay being closed in response to receiving the signal from the processor in response to the processor receiving a test condition command code indicating the test condition of placing a short across the selected cable pair thereby establishing electrical continuity in said means and connecting the short across the selected cable pair to ground.

32. The apparatus of claim 24 wherein the tone network is defined further to include:

a conductor connected to the tip of each of the cable pairs and another conductor connected to the ring of each of the cable pairs;

means for connecting the conductors connected to tip and ring of each of the cable pairs said means for generating the tone signal; and a relay interposed in said means for connecting the conductors to the means for generating the tone signal, the relay having a normally opened position for interrupting electrical continuity in said means for connecting the conductors to the means for generating the tone signal, the relay being closed in response to receiving the signal from the processor in response to the processor receiving the test condition command code indicating the test condition of connecting a tone signal to the selected cable pair, thereby connecting the tone signal to the selected cable pair.

33. The apparatus of claim 25 wherein the ground tip network is defined further to include:

a conductor connected to the tip of each of the cable pairs and another conductor connected to the ring of each of the cable pairs;

means for connecting the conductor connected to the tip of each of the cable pairs to ground; and a relay interposed in the means for connecting the tip of each of the cable pairs to ground, the relay having a normally opened position for interrupting electrical continuity in said means and ground, the relay being closed in response to receiving the signal from the processor in response to the processor receiving the test condition command code indicating the test condition of placing a ground on the tip of the selected cable pair thereby establishing electrical continuity in said means and connecting the tip of the selected cable pair to ground; and wherein the ground network is defined further to include:

a conductor connected to the ring of each of the cable pairs and another conductor connected to the ring of each of the cable pairs;

means for connecting the conductor connected to the ring of each of the cable pairs to ground; and a relay interposed in the means for connecting the ring of each of the cable pairs to ground, the relay having a normally opened position for interrupting electrical continuity in said means and ground, the relay being closed in response to receiving the signal from the processor in response to the processor receiving a test condition command code indicating the test condition of placing a ground on the ring of the selected cable pair thereby establishing electrical continuity in said means and connecting the ring of the selected cable pair to ground.

34. The apparatus of claim 26 wherein the short network is defined further to include:

a conductor connected to the tip of each of the cable pairs and another conductor connected to the ring of each of the cable pairs;

means for establishing a short across the conductors connected to each of the tips and each of the rings; and a relay interposed in the means for establishing a short, the relay having a normally opened position for interrupting electrical continuity in said means, the relay being closed in response to receiving the signal from the processor in response to the processor receiving a test condition command code indicating the test condition of placing a short across the selected cable pair thereby establishing electrical continuity in said means and connecting the short cross the selected cable pair to ground.

35. The apparatus of claim 27 wherein the tone network is defined further to include:

a conductor connected to the tip of each of the cable pairs and another conductor connected to the ring of each of the cable pairs;

means for connecting the conductors connected to tip and ring of each of the cable pairs said means for generating the tone signal; and a relay interposed in said means for connecting the conductors to the means for generating the tone signal, the relay having a normally opened position for interrupting electrical continuity in said means for connecting the conductors to the means for generating the tone signal, the relay being closed in response to receiving the signal from the processor in response to the processor receiving the test condition command code indicating the test condition of connecting a tone signal to the selected cable pair, thereby connecting the tone signal to the selected cable pair.

36. The apparatus of claim 19 wherein the cable pair tester is defined further to include:

a modem connected to the processor for receiving calls over an existing telephone line, the modem answering received telephone calls and connecting the received telephone calls to the processor, the cable pair command codes and the test condition command codes being in the received telephone calls; and wherein the means for supplying the cable pair command codes and the test condition command codes is defined further as being a touch tone telephone and cable pair command codes and the test condition command codes each are defined further as being tone signals generated by the touch tone telephone.

37. The apparatus of claim 2 wherein one of the test conditions is connecting an existing telephone number to the selected cable pair, and wherein the cable pair tester is defined further to comprise:

an auxiliary telephone network adapted to connect an existing telephone number to the selected cable pair in response to receiving a signal from the processor indicating the processor has received the test condition command code uniquely identifying the test condition of connecting an existing telephone number to the selected cable pair, the existing telephone number being connected to the selected cable pair in response to receiving the test condition command code uniquely identifying the test condition of connecting the existing telephone number to the selected cable pair.

38. The apparatus of claim 20 wherein one of the test conditions is connecting an existing telephone number to the selected cable pair, and wherein the cable pair tester is defined further to comprise:

an auxiliary telephone network adapted to connect an existing telephone number to the selected cable pair in response to receiving a signal from the processor indicating the processor has received the test condition command code uniquely identifying the test condition of connecting an existing telephone number to the selected cable pair, the existing telephone number being connected to the selected cable pair in response to receiving the test condition command code uniquely identifying the test condition of connecting the existing telephone number to the selected cable pair.

* * * * *

UNITED STATES PATENT AND TRADEMARK OFFICE
CERTIFICATE OF CORRECTION

PATENT NO. : 4,864,597

DATED : September 5, 1989

INVENTOR(S) : Don C. Fore

It is certified that error appears in the above-identified patent and that said Letters Patent is hereby corrected as shown below:

Col. 1, Line 33, immediately following the word "cable", please delete the punctuation mark -- , --.

Col. 2, Lines 11-12, immediately following the word "telephone", please delete the phrase -- more than likely would simply connect the existing telephone --.

Col. 11, Line 29, please delete the number "2", and substitute therefor the number -- 52 --.

Col. 14, Line 6, please delete the number "6", and substitute therefor the number -- 26 --.

Col. 14, Line 18, please delete the number "520A" and substitute therefor the number -- 1520A --.

Col. 23, claim 1, line 57, please delete the word "group", and substitute therefor the word -- ground --.

Col. 24, claim 1, lines 34-36, please delete the phrase "a signal from the processor indicating the processor has received".

Col. 30, claim 19, line 38, please delete the word "group", and substitute therefor the word -- ground --.

UNITED STATES PATENT AND TRADEMARK OFFICE
CERTIFICATE OF CORRECTION

PATENT NO. : 4,864,597

DATED : September 5, 1989

INVENTOR(S) : Don C. Fore

It is certified that error appears in the above-identified patent and that said Letters Patent is hereby corrected as shown below:

Col. 31, claim 19, lines 13-15, please delete the phrase "a signal from the processor indicating the processor has received".

Col. 32, claim 23, line 25, immediately following the word "network", please insert the word -- is --.

Signed and Sealed this

Eighteenth Day of September, 1990

Attest:

HARRY F. MANBECK, JR.

*Attesting Officer*  *Commissioner of Patents and Trademarks*